United States Patent [19]
Konishi et al.

[11] Patent Number: 5,799,223
[45] Date of Patent: Aug. 25, 1998

[54] CAMERA IN USE OF A FILM CARTRIDGE WHICH CONTAINS A FILM WOUND AROUND A WINDING SHAFT IN A LIGHT-SHIELDING CONDITION

[75] Inventors: Yoshito Konishi, Sakai; Yoshiyuki Inoue, Izumi; Yoshiharu Tanaka, Sakai; Junichi Tanii, Izumi, all of Japan

[73] Assignee: Minolta Co., Ltd., Osaka, Japan

[21] Appl. No.: 866,241

[22] Filed: May 30, 1997

[30] Foreign Application Priority Data

| May 31, 1996 | [JP] | Japan | 8-106915 |
| May 31, 1996 | [JP] | Japan | 8-106916 |
| May 31, 1996 | [JP] | Japan | 8-106917 |

[51] Int. Cl.⁶ .................................................. G03B 17/24
[52] U.S. Cl. ............................................................ 396/538
[58] Field of Search .................................... 396/538, 535, 396/536

[56] References Cited

U.S. PATENT DOCUMENTS

| 4,363,547 | 12/1982 | Hashimoto et al. |
| 4,841,319 | 6/1989 | Hansen. |
| 5,432,573 | 7/1995 | Lawther et al. |
| 5,604,558 | 2/1997 | Kawakita ............... 396/538 |
| 5,634,165 | 5/1997 | Nakagawa et al. ...... 396/538 |

*Primary Examiner*—David M. Gray
*Attorney, Agent, or Firm*—Burns, Doane, Swecker & Mathis, LLP

[57] ABSTRACT

A camera in use of a film cartridge which contains a film wound around a winding shaft in a light-shielding condition, wherein an output of a motor that is disposed in a movable cartridge chamber drives the cartridge chamber to open and close, driven members that are arranged in a camera body, and driven members that are arranged in the cartridge chamber. Therefore, there is no need to arrange a complicated transmitting mechanism which transmits a driving force from a motor in the camera body, which makes it possible to simplify a driving force transmitting mechanism.

15 Claims, 21 Drawing Sheets

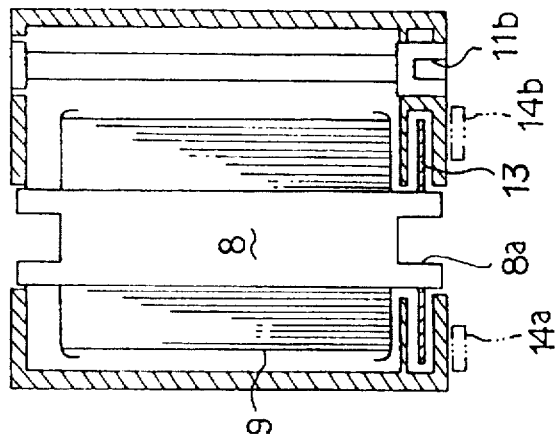
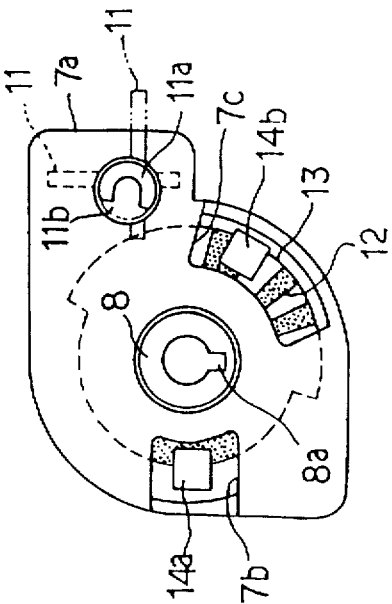
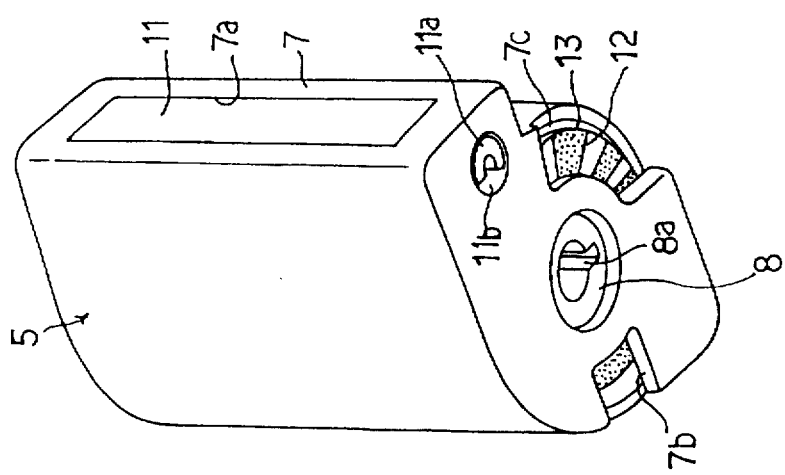

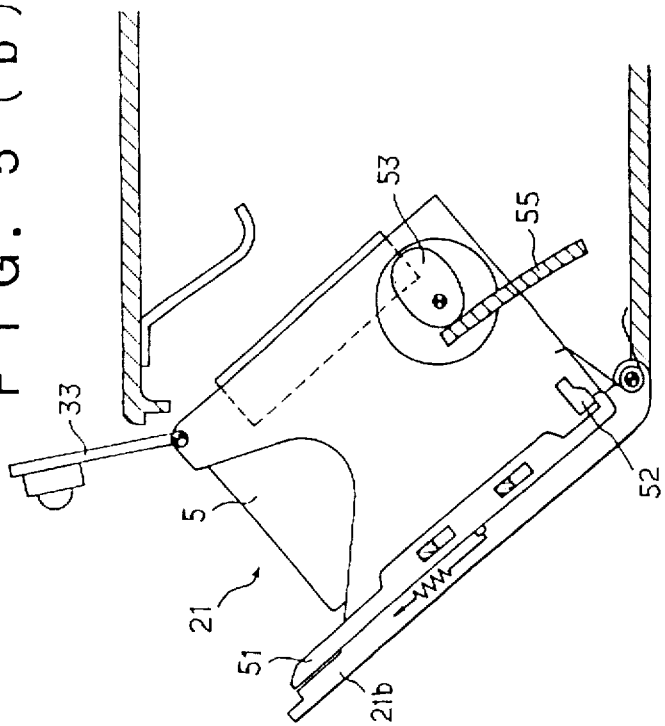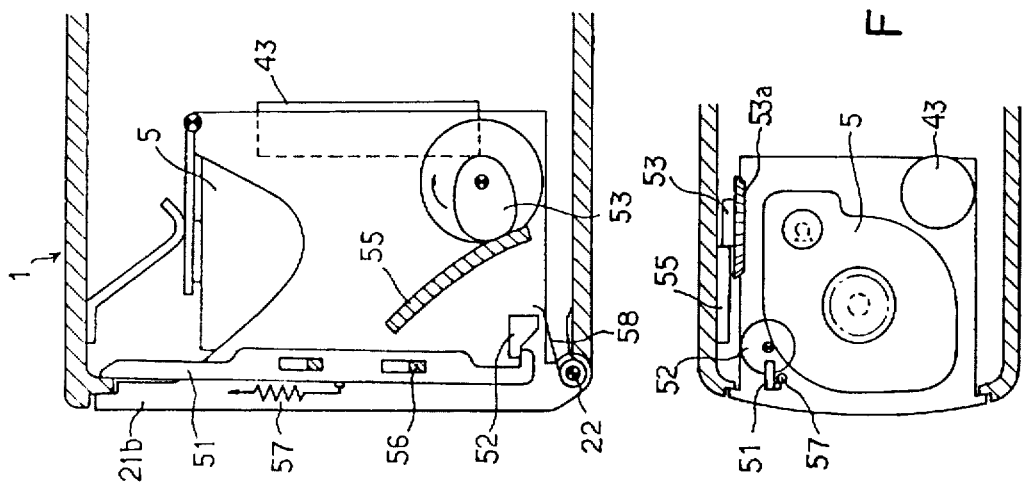

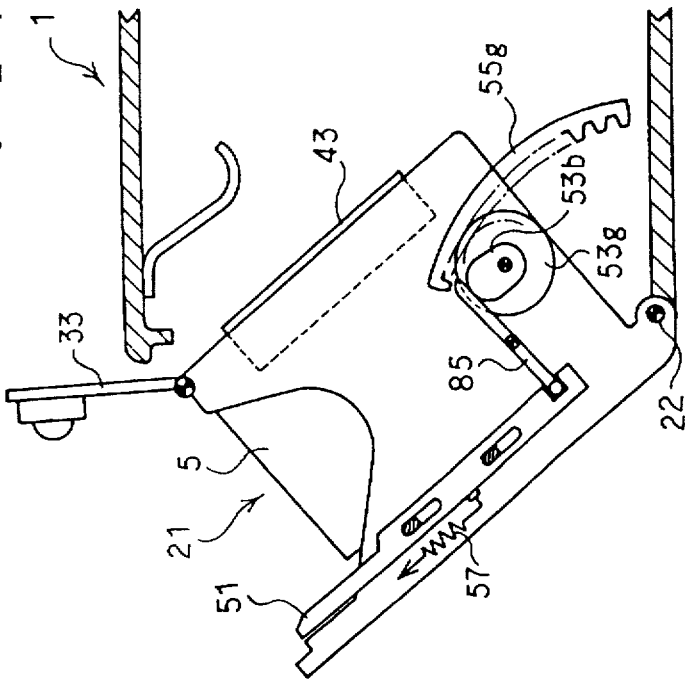
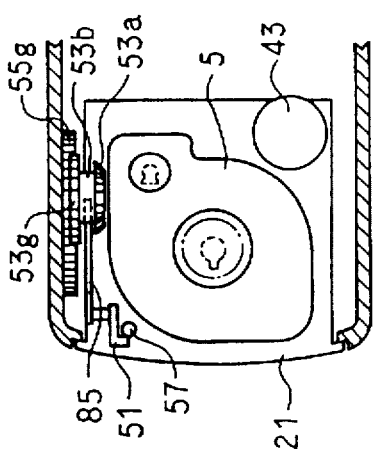
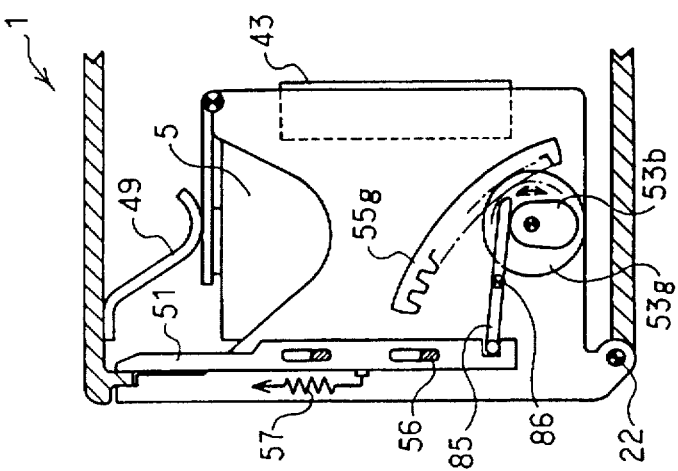

F I G. 2 1
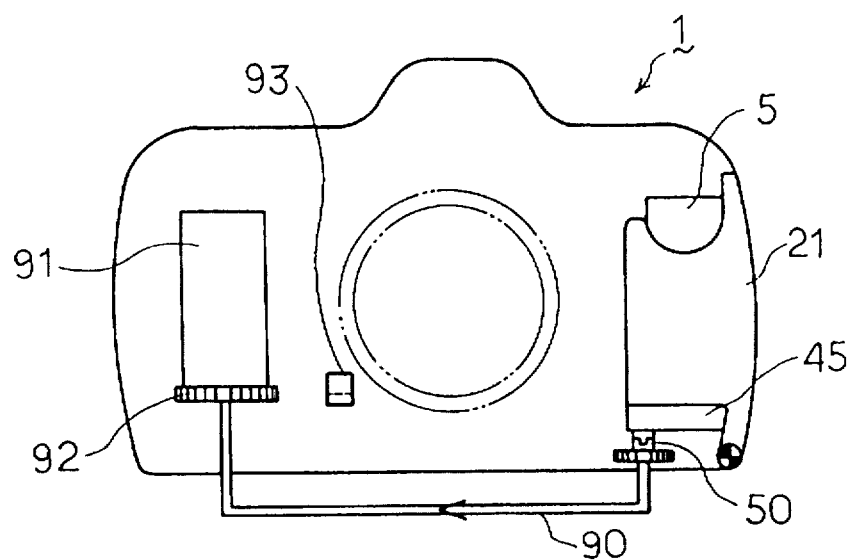
F I G. 2 2
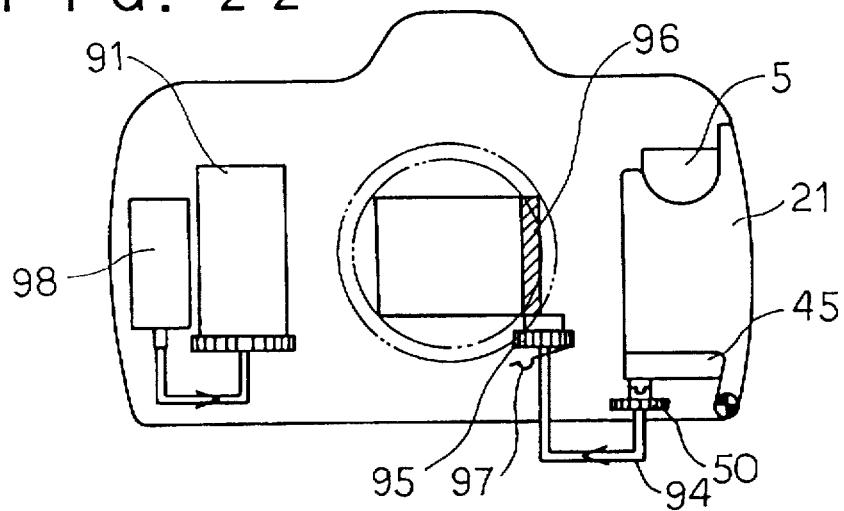

CAMERA IN USE OF A FILM CARTRIDGE WHICH CONTAINS A FILM WOUND AROUND A WINDING SHAFT IN A LIGHT-SHIELDING CONDITION

BACKGROUND OF THE INVENTION

The present invention relates to a camera in use of a film cartridge which contains a film wound around a winding shaft in a light-shielding condition, and more particularly, to a structure wherein a cartridge chamber which accommodates a film cartridge so as to be taken in and out, is arranged to be opened and closed between a position that it is contained in a camera body, and a position that a hollow to take in a film cartridge is projected out of the camera body.

In the above-mentioned camera, a film is able to be loaded and used when the cartridge chamber is moved into a position to contain it after taking in a film cartridge. A shading lid which is provided on a film exit of the cartridge is automatically opened by a driving system of a camera body. Then, a winding shaft is driven to feed the film out of the cartridge to a winding spool of the camera body, thereby, an operation of winding up the film can be achieved by a shutter release operation. Besides, when the film is taken out, the shading lid of the film cartridge is automatically closed after completely winding up the film by driving a winding shaft toward a film winding direction. This prevents the film in the cartridge from being exposed even if the cartridge chamber is opened into the position to project. In addition, the cartridge chamber is locked in the position to contain by lock members in order not to be unexpectedly opened.

These lock members are commonly provided in the camera body (refer to the Japanese Patent Unexamined Publication No. 4-80735 gazette as an example). In the above-mentioned structure wherein the cartridge chamber is opened and closed, if any member of the camera body is arranged on a trace of opening and closing movement of the cartridge chamber, it may touch some member in the cartridge chamber at an the opening and closing time. Therefore, lock members are required to be arranged out of the trace.

When the lock members are arranged on a camera body, a cartridge chamber is able to be easily unlocked by a driving force of a motor disposed in the camera body. However, since the above-mentioned cartridge chamber comprises many driven members such as a member to open and close a shading lid, a member to wind up a film and the like, it is necessary to arrange a driving force transmitting mechanism for transmitting the motor's driving force from the camera body side to the cartridge chamber side in order to drive these members.

Furthermore, a driving mechanism to open and close a cartridge chamber (ejection) is commonly arranged on the camera body, and also required to be arranged out of a trace of opening and closing movement of the cartridge chamber just like the case of the above-mentioned lock members.

As mentioned above, in the structure wherein lock members are arranged on the camera body, there occurs a restriction in designing to arrange the lock members out of a trace of opening and closing movement of the cartridge chamber; and besides, since the trace is provided by the most projected part of the cartridge chamber, a dead space is remained between the trace and the cartridge's outline, then, a space in the camera body is not used effectively, which causes a disadvantage for miniaturizing a camera.

Moreover, in order that a cartridge chamber can be opened and closed by a driving force of a motor disposed in a camera body, the driving force transmitting mechanism for the same is required in addition to a driving force transmitting mechanism for thrusting and rewinding a film, and driving a shading lid, so that the structure is complicated.

This problem can be solved by disposing a driving source in a cartridge chamber. In such a case, the above-mentioned lock members should be also arranged not in the camera body, but in the cartridge chamber in order to simplify the transmitting mechanism.

Furthermore, in the structure wherein a driving force is transmitted from a camera body side to driven members in a cartridge chamber, since the cartridge chamber is movable, it requires a mechanism which engages and disengages a transmission of the driving force, which further complexes the structure. Besides, as for the opening and closing of a shading lid of a film cartridge, timing phases of its start and finish are previously set; consequently, these timing phases are required to be adjusted to each other in the camera sequence in order that a shading lid driving member may engage and disengage with a driving member in the camera body, which complicates the structure for opening and closing the cartridge chamber.

Also, as for arranging a driving system and a changeover mechanism in the above-mentioned camera, it is effective to dispose a driving motor close to a cartridge because most driven members are arranged around a cartridge chamber, such as a mechanism for a forward and reverse rotation of a film winding shaft, a mechanism for opening and closing a shading lid, a lock mechanism, and the like. In such a case, although all of these driven members and the motor can be moved unitedly with the cartridge chamber, some driven members (such as members for winding a film, releasing and charging a mirror and a shutter) still exist in the camera body. This problem can be solved by disposing another motor around the winding spool for winding up the film. Even in such a case, some driven member in the camera body may exist near around the cartridge chamber, so a driving force transmitting mechanism is required to drive them.

SUMMARY OF THE INVENTION

The present invention is made to solve the above-mentioned problems, and an object of the present invention is to provide a camera, wherein a mechanism to transmit a driving force from a camera body is able to be simplified by reason that a motor disposed in a cartridge chamber drives the cartridge chamber to open and close, and besides, a dead space of the cartridge chamber is able to be effectively used for a driving member to open and close the cartridge chamber is arranged in the cartridge chamber, which makes it possible to reduce space within the camera.

Another object of the present invention is to provide a camera, wherein there is no need to equip a complicated driving force transmitting mechanism because a motor disposed in a movable cartridge chamber drives driven members that exist around the cartridge, and besides, there is no need to adjust timing phases of mechanisms in a camera sequence even in case of driving the shading lid of the film cartridge, so that a mechanism to open and close the cartridge chamber is not complicated, which is advantageous to an engagement and a disengagement of a motor output.

A further object of the present invention is to provide a camera whose driving force transmitting mechanism is able to be simplified by reason that there is no need to equip a mechanism to engage and disengage a transmission of a driving force, and adjust timing phases in a camera sequence for driving mechanisms to feed (thrust/rewind) the film, and open and close the shading lid is completed within the cartridge chamber.

According to a feature aspect of the present invention, a cartridge chamber which accommodates a film cartridge, is supported to a camera body so as to open and close between a position that a hollow to take in and out the cartridge is projected out of the camera body and a position that the cartridge chamber is contained in the camera body, and besides, an output of the motor disposed in the cartridge chamber executes at least either one of opening and closing of the cartridge chamber. As a result, a mechanism to open and close the cartridge chamber is able to be arranged in a dead space of the cartridge chamber so that a space in the cartridge chamber is effectively used.

According to a further feature of the present invention, an output of the motor disposed in the cartridge chamber is transmitted to at least one of the driven members of the camera body by a driving force transmitting mechanism, and drives it, such as a film winding shaft. Therefore, most of the driven members in the movable cartridge chamber is able to be driven without a complicated driving force transmitting mechanism. Especially, in case of opening and closing a shading lid of the film cartridge which is contained in the cartridge chamber, a timing phase of each mechanism is not required to be adjusted in a camera sequence since a mechanism for transmitting the driving force from the camera body side to the cartridge chamber is not used.

According to a further feature of the present invention, driven members of the cartridge chamber are driven by an output of the motor which is disposed in the cartridge chamber. Consequently, a mechanism to engage and disengage a driving force transmission system is more simplified than a case that driven members in a cartridge chamber are driven by a motor disposed in a camera body.

BRIEF DESCRIPTION OF THE DRAWINGS

FIGS. 3(a), (b) and (c) are a perspective view, a sectional view, and a bottom view showing a film cartridge which is used in the camera shown in FIG. 1.

FIGS. 5(a), (b) and (c), illustrating a lock and an ejection mechanism of the camera shown in FIG. 1, are a sectional view showing a state that a cartridge chamber is closed, a sectional view showing a state that it is opened, and a bottom view showing a state that it is closed.

FIGS. 14(a), (b) and (c), illustrating a lock and an ejection mechanism in the sixth embodiment of the present invention, are a sectional view showing a state that a cartridge chamber is closed, a sectional view showing a state that it is opened, and a bottom view showing a state that it is closed.

FIG. 21 is a structural view showing a film winding up as an example of a driven member in a camera body.

FIG. 22 is a structural view showing that a mirror and a shutter are charged and released.

DETAILED DESCRIPTION OF THE PREFERRED EMBODIMENTS OF THE PRESENT INVENTION

Figure 1:
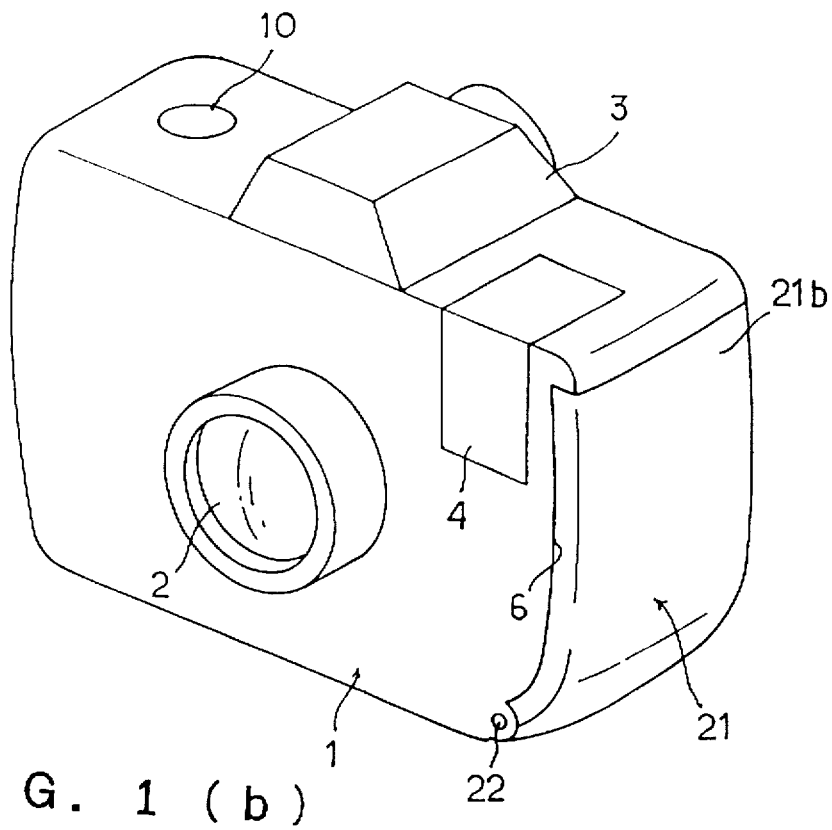
FIGS. 1(a) and (b) are perspective views showing a state that a film cartridge is loaded in a camera, and a state to take in and out the film cartridge in the first embodiment of the present invention.
Figure 1:
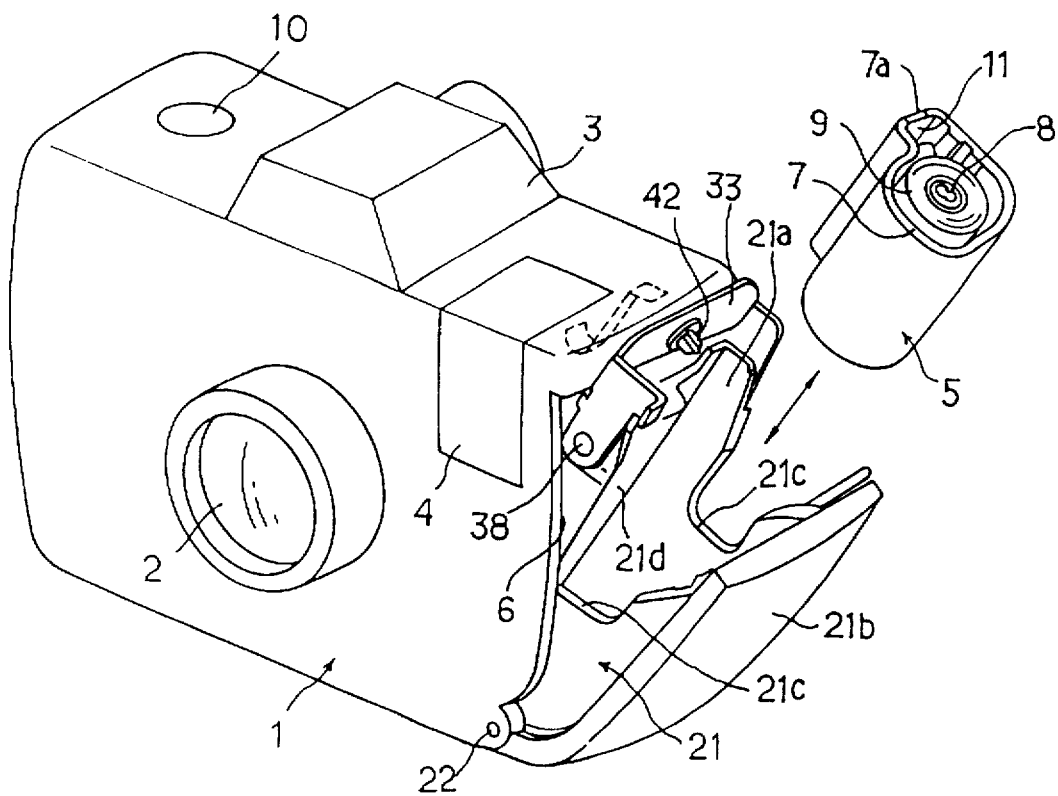
Figures 2A, 2B:
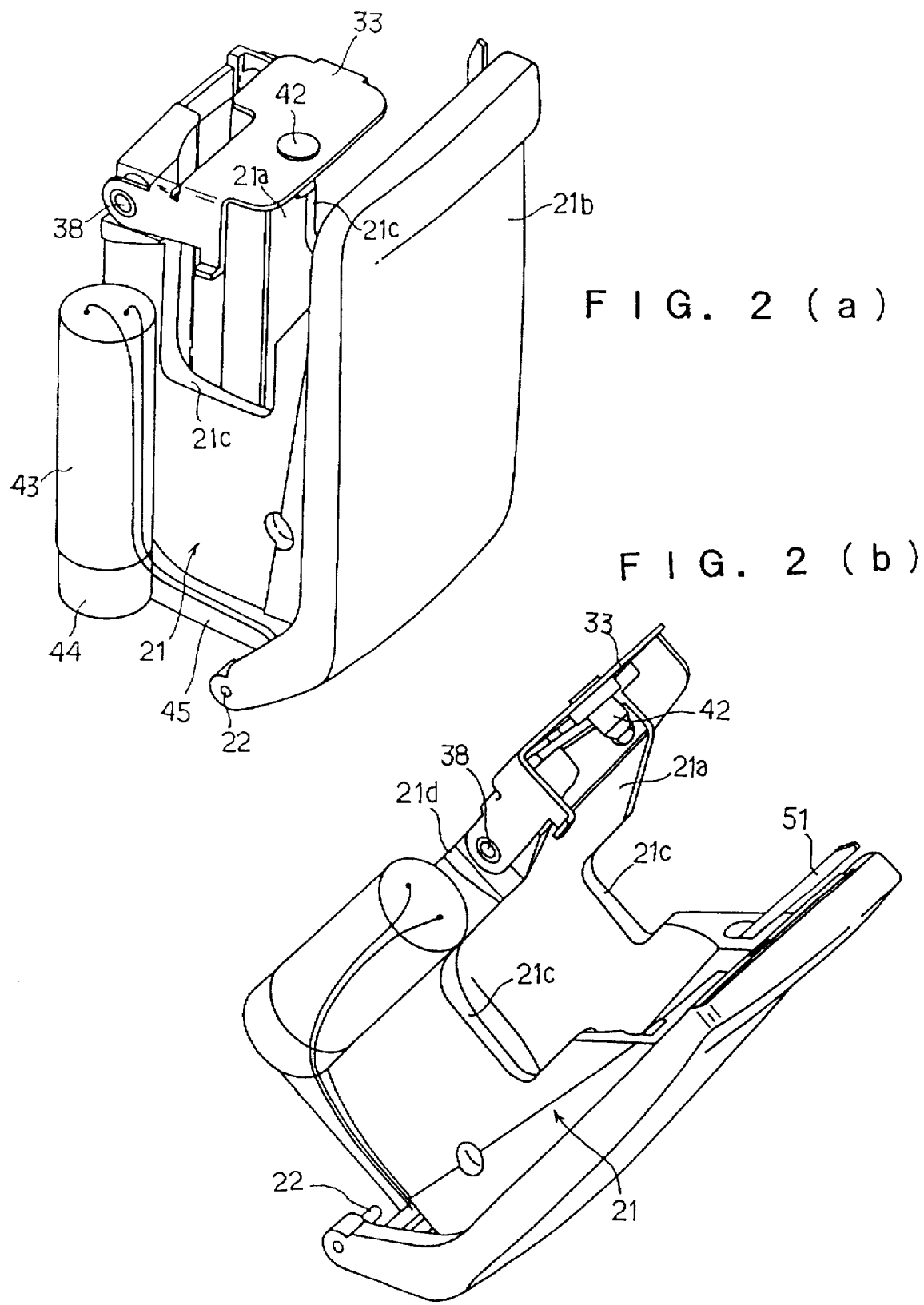
FIGS. 2(a) and (b) are perspective views showing a state that a cartridge chamber of the camera used in FIG. 1 is contained and projected.

Now, embodiments of the present invention will be explained referring to the drawings. FIGS. 1(a) and (b) are perspective views of a single-lens reflex camera in the first embodiment. FIGS. 2(a) and (b) are perspective views showing a film cartridge loading unit. FIGS. 3(a), (b) and (c) are views showing a film cartridge. A photographing lens 2 and a popping up-and-down flash light emitting member 4 are provided on the front side of the camera body 1. A release button 10 is positioned on the right side of the upper surface. A viewfinder 3 employing a pentagonal prism is positioned on the upper center. An opening 6 for loading a film cartridge 5 is positioned on the opposite side of the release button 10, the left side of the camera body 1.

A film cartridge 5 comprises a resin cartridge case 7, and a winding shaft 8 is vertically arranged at the center of the bottom surface of the cartridge case 7 so as to be rotatable. The winding shaft 8 fixes one end of a film 9, so it is able to wind up the film 9 into the cartridge case 7 by rotating toward a film winding direction, and thrust the film 9 through a film exit 7a of the cartridge case 7 by rotating toward a reverse direction. A shading lid 11 is arranged at the film exit 7a so as to be opened and closed between an open state shown on a two-dot chain line in FIG. 3(c) and a close state shown on a dotted line in the same; therefore, the shading lid 11 is supported on a shaft member 11a. The cartridge case 7 has a sectional shape that the film exit 7a is slightly projected out of a part of the outer circumference along the tangent line.

A bar code plate 13 having a bar code 12, etc. toward. the direction of the circumference, is provided on the winding shaft 8, and a film data is read out therefrom, such as a kind of a film, a film quality, an unexposed condition of a film and the like. In order to read out such a information, windows 7b and 7c for reading out are formed on an end plane of the cartridge case 7, facing to a photo-sensor 14a, 14b and so on which are arranged inside of a cartridge chamber 21 disposed inside of the opening 63 of the camera body 1 as shown in FIG. 3(b).

Stopping the winding shaft 8 at a prescribed position by employing the above-mentioned bar code plate 13 and the like, an indicator disposed on another plane (not shown in FIG. 3(a)) of the cartridge 5, is able to indicate an exposure condition off a film (unexposed, partially exposed, entirely exposed, developed). The photo-sensor 14a and 14b in the cartridge chamber 21 are connected to a control circuit (not shown) of the camera body 1 by an electric signal harness 46 (shown in following FIG. 4) which reaches on the bottom part of the cartridge chamber 21 from a bottom part of the camera body 1 through a juncture part in which the cartridge chamber 21 is supported by a pivot 22. As a result, this simplifies a connection structure, and besides, a route of the harness 46 is not changed by a movement of the cartridge chamber 21 between a position to project and a position to contain, so a signal is able to be received and transmitted without being affected by a movement of the cartridge chamber 21.

The cartridge chamber 21 which is positioned on the opening 6 of the camera body 1, has a hollowed shape loosely fitted to a cross section of the cartridge case 7, and is able to load a film cartridge 5 constantly in the same direction by inserting it in a hollow 21a for taking in and out the film cartridge 5, and the hollow 21a is opened upward along with a shaft line of the winding shaft 8. The cartridge chamber 21 comprises a cover 21b to cover the opening 6, and the cover 21b is supported at its lower part to both sides of a lower part of an edge of the opening 6 so as to be opened and closed by a pivot 22. Scooped parts 21c are formed on the upper end of walls of both sides in order to easily pinch the film cartridge 5 when taking in and out.

The cartridge chamber 21 comprises a lid plate 33 to close its hollowed part. The lid plate 33 is supported to an upper edge of an inside wall 21d which is opposite to the cover 21b of the cartridge chamber 21 so as to be opened and closed by a pivot 38 which is in parallel with the above-mentioned pivot 22. The lid plate 33 is pressed toward an opening direction by a spring 39 (shown in FIG. 4). When the cartridge chamber 21 is moved between a position to contain and a position to project, the lid plate 33, engaging with a part of the camera body, is in a state to close by interlocking with the cartridge chamber 21 when it moves into a position to contain, and in a state to open by interlocking with the cartridge chamber 21 when it moves into a position to project. The lid plate 33 comprises a supporting shaft 42 to support the upper part of the film cartridge 5. The cartridge chamber 21 comprises a motor 43 to drive all of driven members in the cartridge chamber 21, a speed reduction system 44, and a speed reduction output changeover mechanism 45.

Figure 4:
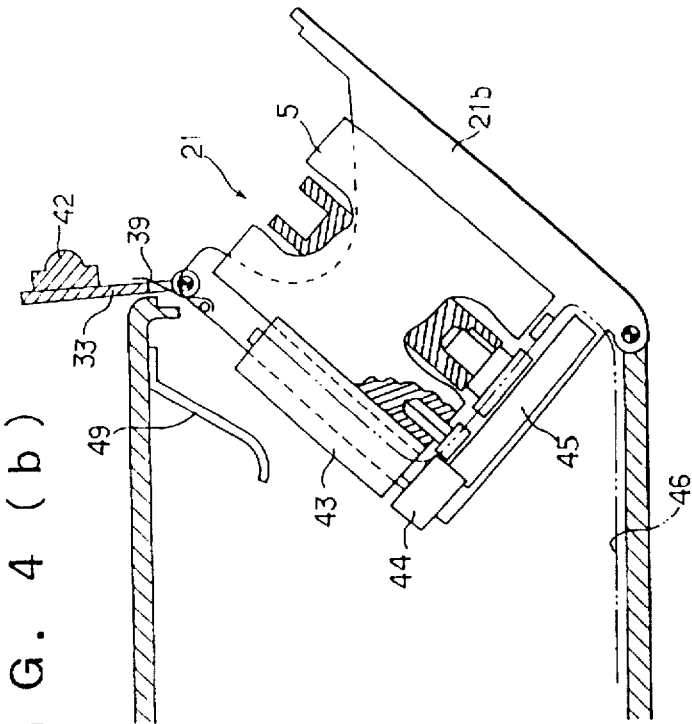
FIGS. 4(a), (b) and (c) are a sectional view showing a state that a cartridge chamber of the camera shown in FIG. 1 is closed, a sectional view showing a state that it is opened, and a bottom view showing a state that it is closed.
Figure 4:
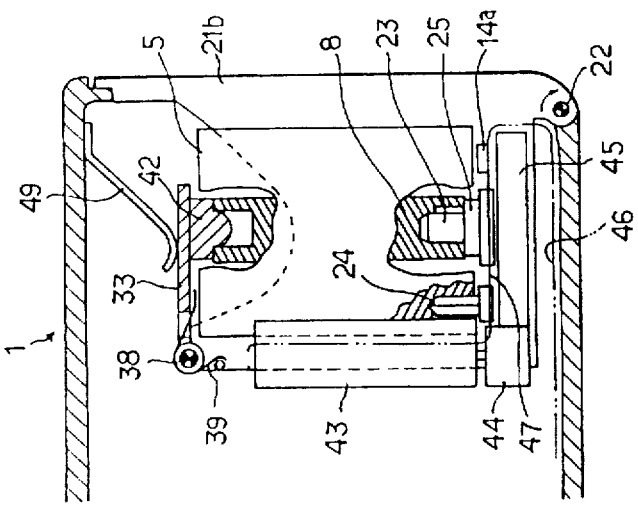
Figure 4:
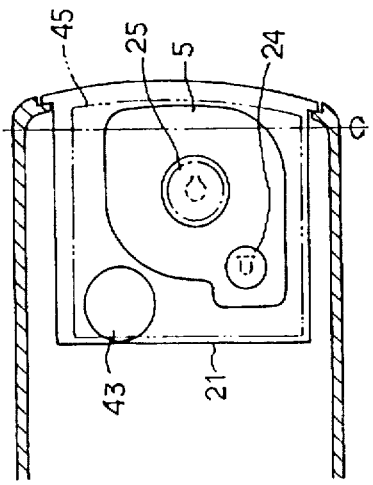

Now, an open and close mechanism of the cartridge chamber 21 will be explained referring to FIG. 4. FIG. 4(a) shows a state that the cartridge chamber 21 is closed (a position to contain), FIG. 4(b) shows a state that the cartridge chamber 21 is opened (a position to project), FIG. 4(c) shows a bottom surface in the state shown in FIG. 4(a). The cartridge chamber 21 comprises on its bottom part, a fork 23 which engages with a bottom end of the winding shaft 8 of the film cartridge 5 loaded in the cartridge chamber 21 and drives the winding shaft 8, a shading lid driver 24 to drive the shading lid 11 to open and close by engaging with a bottom end of a pivot 11a of the shadings lid 11, and a cartridge chamber circuit board 47 to which an electric signal harness 46 is connected. These are moved unitedly with the cartridge chamber 21 when it is opened and closed as shown in FIG. 4(a) and (b).

In a state that the cover 21b covers the opening 6, it becomes flat on the outline surface of the camera body 1, and the cartridge chamber 21 is in a position that it is contained in the camera body 1. In a state that the cover 21b uncovers the opening 6, the cartridge chamber 21 is in a position that it is projected out of the camera body 1, and the hollow 21a is opened and projected, in which the film cartridge 5 is able to be taken in and out from the cartridge chamber 21. Inside the camera body 1 which contains the cartridge chamber 21, a pressing spring 49 which is consisted of a plate spring and etc., presses down the cover plate 33. When the cartridge chamber 21 is opened, the cover plate 33 moves with its upper side pressed by the pressing spring 49, so it does not touch a ceiling of the camera body 1. After the cartridge chamber 21 is completely opened, the pressing spring 49 is released, and the cover plate 33 moves away upward by the spring 39.

The cover plate 33 comprises the supporting shaft 42 which fits into the upper end of the winding shaft 8 of the film cartridge 5 which is loaded in the cartridge chamber 21. The supporting shaft 42 and the fork 23 sandwich the winding shaft 8 to support it, and also, the supporting shaft 42 supports the film cartridge by suspending it in the cartridge chamber 21. Then, a fork gear 25 is driven to rotate the fork 23 which is connected there to. The supporting shaft 42, formed in a comparatively short shape, is able to smoothly go out from and come into the upper end of the winding shaft 8 according as the cover plate 33 is opened and closed by rotating on the pivot 38. An engagement length between a driving shaft of the fork 23 and a key groove 8a (shown in FIG. 3) of the winding shaft 8, and an engagement length between a key of the shading lid driver 24 and a key groove 11b (shown in FIG. 3) of a shaft 11a of the shading lid 11 are formed in a long shape, so the film cartridge 5 is correctly positioned. Their engagement directions agree with a direction that the cartridge chamber 5 is taken in and out of the cartridge chamber 21, so they engages smoothly with each other even if their engagement length is comparatively long.

Now, a lock mechanism and an ejection mechanism will be explained referring to FIG. 5. FIG. 5(a) shows a close state that the cartridge chamber 21 is locked, FIG. 5(b) shows an open state that the cartridge chamber 21 is unlocked and ejected, and FIG. 5(c) shows a bottom surface in the state shown in FIG. 5(a). The cartridge chamber 21 comprises a lock lever 51 (lock members which constitutes a lock mechanism to lock the cartridge chamber 21 (strictly means the cover 21b, the same as follows) in the position to contain by engaging with the camera body 1, an unlock cam 52 to unlock the locked cartridge chamber 21, and an ejection cam 53 to eject the cartridge chamber 21. The ejection cam 53 is driven to rotate by reason that a driving force of a motor 43 is transmitted to an ejection input gear 53a which is arranged unitedly with the ejection cam 53. The ejection cam 53 is engaged with an ejection cam engaging surface 55 which is provided on a inside wall of a back surface of the camera body 1.

The above-mentioned lock lever 51, arranged on a surface of a inside wall of the cover 21b so as to be slided up and down by a lock lever slide guide 56, is pressed toward a locking direction by a lock lever pressing spring 57, and a lower end part of the lock lever 51 is positioned on the unlock cam 52 so as to be attachable. The unlock cam 52 and ejection cam 53 are driven to rotate by the motor 43 disposed in the cartridge chamber 21.

In the above-mentioned structure, unlocking of the cartridge chamber 21 is achieved by means that an ejection button (not shown) is operated, and the motor 43 is driven to rotate the unlock cam 52, which drives the lock lever 51 downward against a driving force of the lock lever pressing spring 57. Following it, the ejection cam 53 is driven to rotate. At this time, the cartridge chamber is moved into a position that it is opened by the pressing spring 58 so as to fill up a space between the ejection cam 53 and ejection cam engaging surface 55. Since the lock lever 51 is arranged in the cartridge chamber 21, not in the camera body 1, it is able to arrange it in a dead space of the cartridge chamber 21 without concerning a trace of the movement of the cartridge chamber 21, which makes It possible to use the space effectively.

When the cartridge chamber 21 is closed, the cover 21b of the cartridge chamber 21 is manually closed and pushed into the end, then, the lock lever 51 is therewith retracted downward because its slope of the upper part is pushed down at an entrance of an aperture of the camera body 1, and passes through the entrance, so the cartridge chamber 21 is locked by the spring 57. The movement of the lock lever 51 is detected by a switch or the like which is not shown, and the ejection cam 53 is driven to an initial phase shown in FIG. 5(a). These process are corresponds to S101 and S102 shown in following FIG. 7. Moreover, as a result that the ejection cam 53 is driven to an initial phase, the cartridge chamber 21 is drawn into the camera body, so if the ejection cam 53 is driven by detecting the movement of the cartridge chamber 21, it will be possible to realize an automation of the closing movement of the cartridge chamber 21, and lock the cartridge chamber 21 in the state to close by an ejection cam 53. Then, the lock lever 51 can be omitted.

By transmitting a driving force of the motor 43 disposed in the cartridge chamber 21 to the shading lid driver 24 through the speed reduction system 44 and the changeover mechanism 45, the shading lid 11 is driven to open and close, the unlock cam 52 is driven to unlock, and the ejection cam 53 is driven to open the cartridge chamber 21; that is, these driving are completed within the cartridge chamber 21. Therefore, even if any output system which transmits a driving force of a motor in the camera body is not provided close to the cartridge chamber 21, the cartridge chamber 21 is able to be driven to open and close. If an output of a motor in the camera body is transmitted to the cartridge chamber in order to wind up a film, it is necessary to arrange a gear row and the like across an picture frame part of the camera, which increases the camera size vertically. However, in the camera according to the present invention, there does not occur such kind of problem.

Also, provided that a driving mechanism is disposed on the exterior of the cartridge chamber 21, and a fixed member is arranged in the camera body, the cartridge chamber 21 is able to be driven to open and close without equipping a complicated mechanism inside the camera body, which means that, as for a connection mechanism between the movable cartridge chamber 21 and the camera body, it only requires a guide unit for the movement of the cartridge chamber 21, and the lock unit for closing the cartridge chamber 21, and does not require an engagement and disengagement mechanism for transmitting the driving force. As for a motor connection, it only requires an electric connection. Thus, they do not affect the movement of the cartridge chamber 21.

Further, in case of transmitting a driving force from the camera body in order to open and close the shading lid 11, it commonly requires a complicated structure because a timing phase of an open and close mechanism of the cartridge chamber needs to be adjusted. However, a structure is simplified in the camera of the present invention, which can avoid much troubles. Besides, in the movable cartridge chamber 21, since a driving system for the film winding shaft 8 is originally needed, the driving force of the above-mentioned motor 43 can be used both for the film winding and for the opening and closing drive of the shading lid 11.

Moreover, because the cartridge chamber 21 is driven to open by slowly leaving the ejection cam 53 (engagement member) from the fixed ejection cam engagement surface 55, even if the cover 21b is pushed in when it is moving, it only charges the pressing spring 58 which presses the cartridge chamber 21 toward the direction that it is opened, which means that there does not occur any trouble even if a clutch mechanism is not arranged in the driving system.

Figure 6:
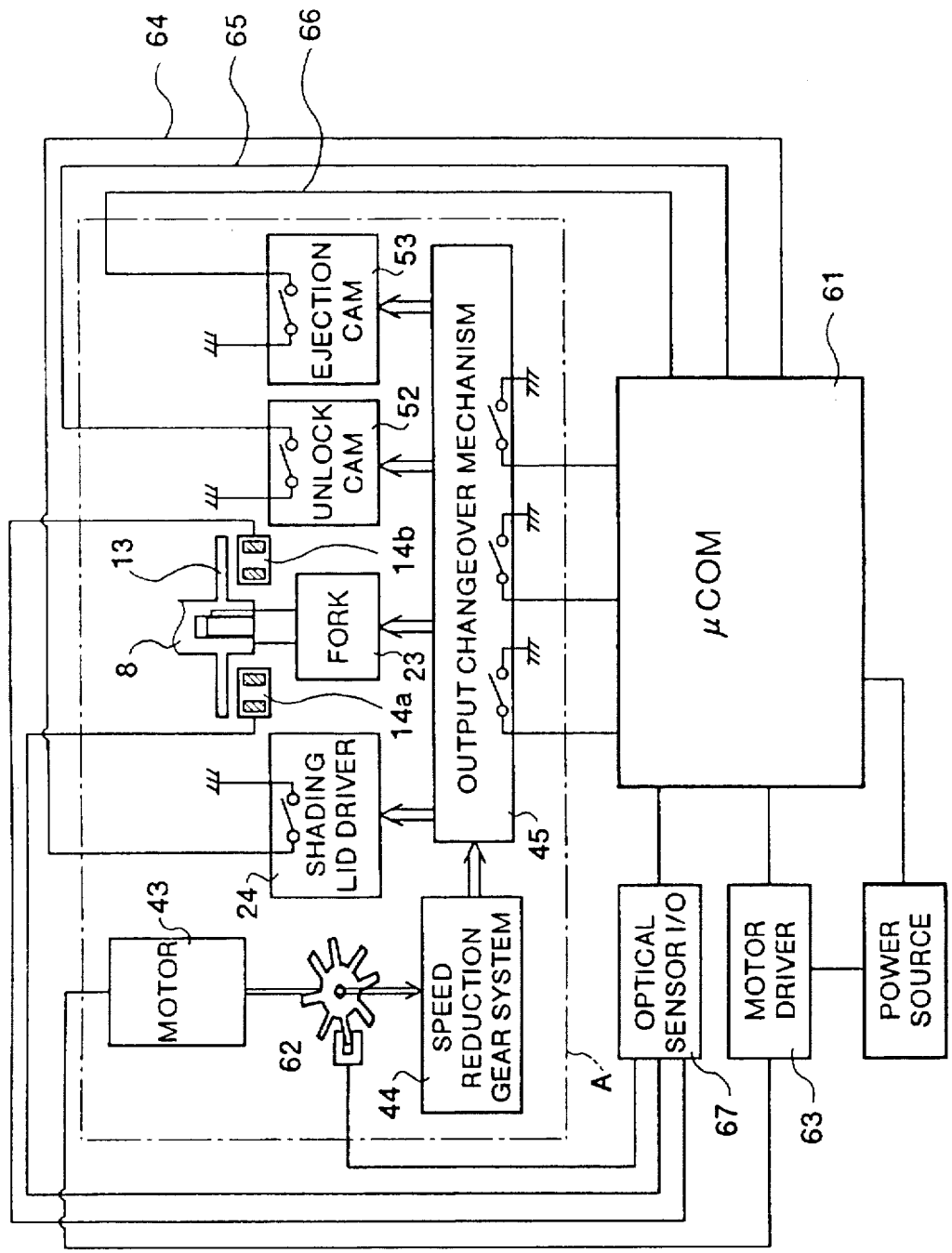
FIG. 6 is a circuit block diagram in case of using one motor in the camera shown in FIG. 1.

FIG. 6 shows a circuit block diagram in the case of using a motor in the above-mentioned embodiment. Mechanisms within the cartridge chamber 21 are circled by a chain line A. Double-line arrows show flows of a power of mechanisms. Solid lines show flows of electric signals. A camera sequence is executed by a micro computer (μ COM) 61. A rotation of the motor 43 is detected by a motor rotation amount sensor 62 consisted of an encoder board and photo-interrupter which are arranged in the motor shaft. The motor 43 is driven by a μ COM 61 through a motor driver 63. Then its output power is input, through the speed reduction gear system 44, in an output changeover mechanism 45 which changes over the output to driven members, following which, the output is changed over according to a prescribed camera sequence, and drives driven members. The output changeover mechanism 45 contains a planet gear mechanism and the like. Which driven member is connected to the output of the motor 43 can be detected by a changeover output of a detection switch, and it is input in the μ COM 61.

A fork 23 is driven to rotate forward and reversely, and thrust and rewind a film. When the film winding shaft 8 of the film cartridge 5 is rotated by the fork 23, information such, as a kind of the film is read out by bar code sensors 14a and 14b which are arranged facing each other so as to correspond to a pattern of a bar code plate 13. Each of the shading lid driver 24, unlock cam 52 and ejection cam 53 has a position detection switch, and position detection signals 64, 65 and 66 of them are input to the μ COM 61, therefore, these members are stopped at a prescribed phase. Outputs from the motor rotation amount sensor, 62, bar code sensors 14a and 14b are input to the μ COM 61 through an optical sensor interface 67, and the μ COM 61 executes a camera sequence.

Figure 7:
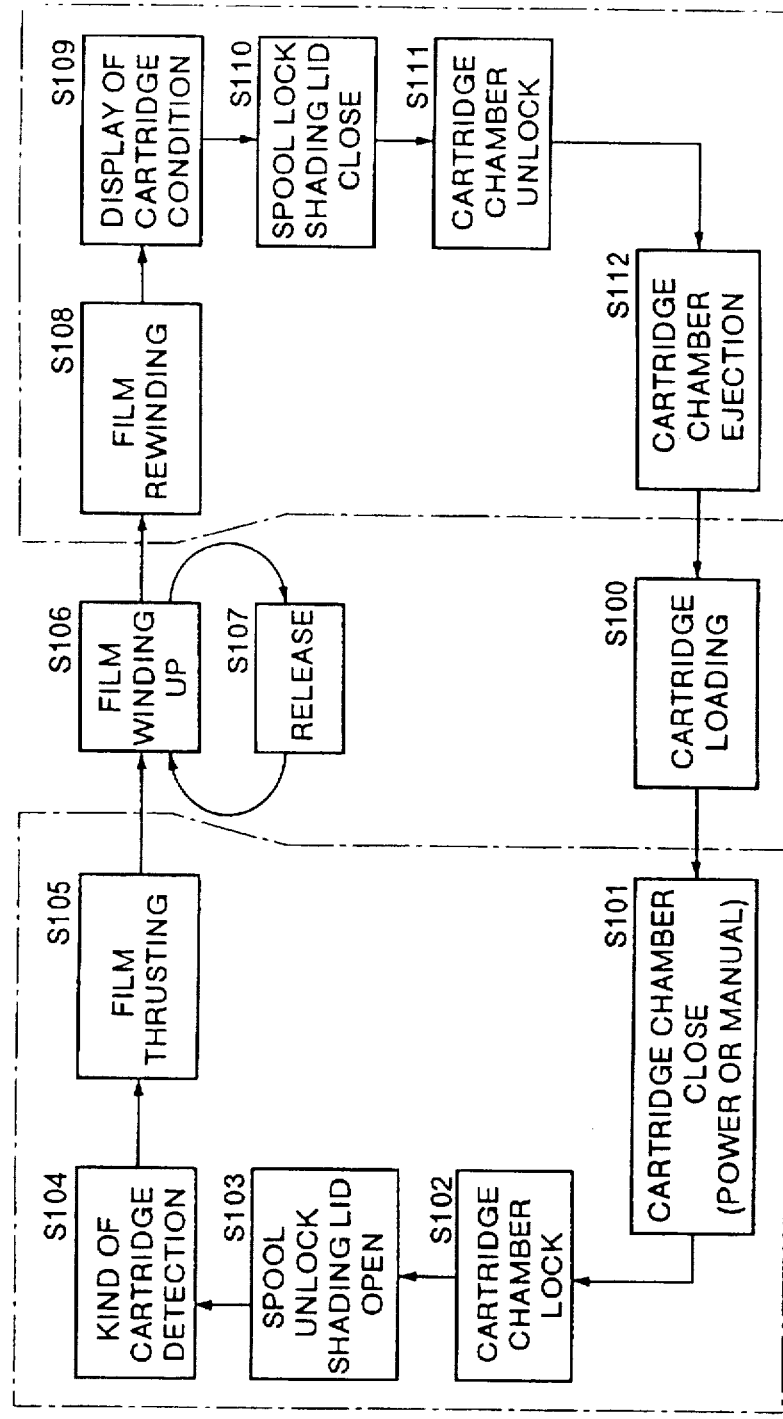
FIG. 7 is a view showing a operation sequence of the camera shown in FIG. 1.

FIG. 7 shows an outline of an operation sequence of the camera. Operations which are circled by chain lines are executed by a mechanism arranged in the cartridge chamber 21. After the film cartridge is loaded (S100), there comes each sequence as follows: the cartridge chamber close (by a motor power or a manual operation) (S101), the cartridge chamber lock (S102), the spool unlock, and the shading lid open (S103), the cartridge type judgment (S104), the film thrusting (S105), the film winding up (S106), the film releasing (S107), the rewinding of the film (S108), display of the cartridge condition (S109), the spool lock, and the shading lid close (S110), the cartridge chamber unlock (S111), and after coming the sequence of the ejection of the cartridge chamber (S112), it returns to an initial sequence.

Figure 8:
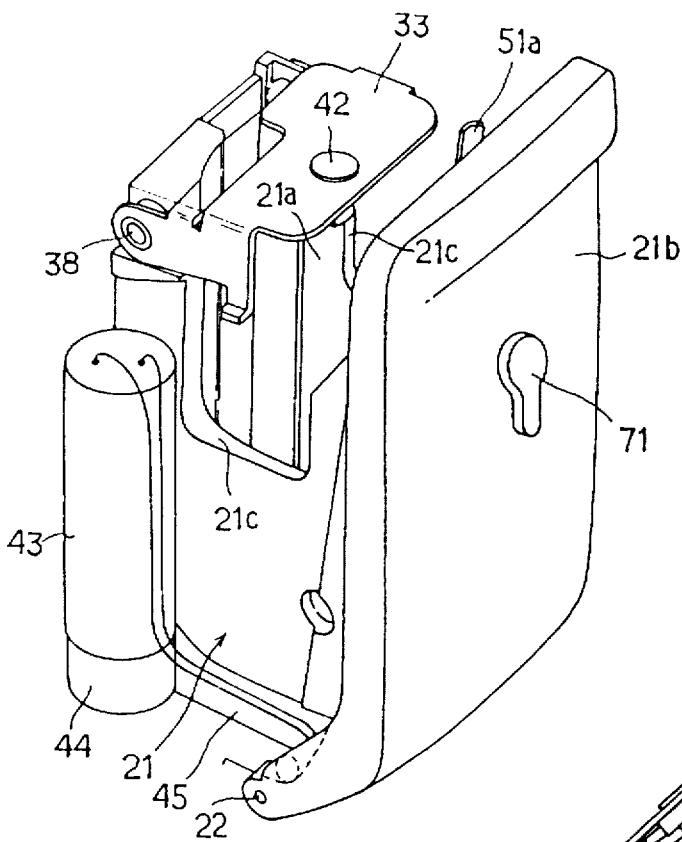
FIGS. 8(a) and (b) are figures in the second embodiment of the present invention.
Figure 8:
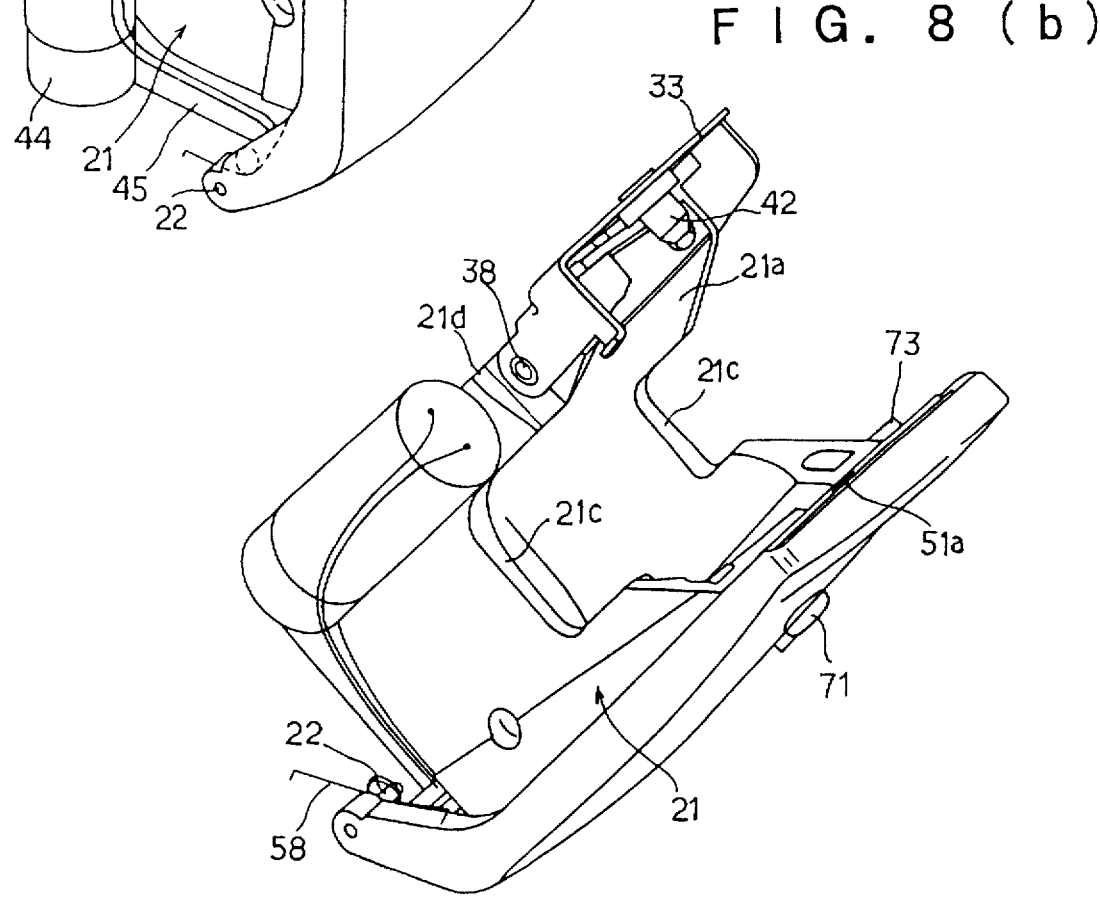
Figure 9:
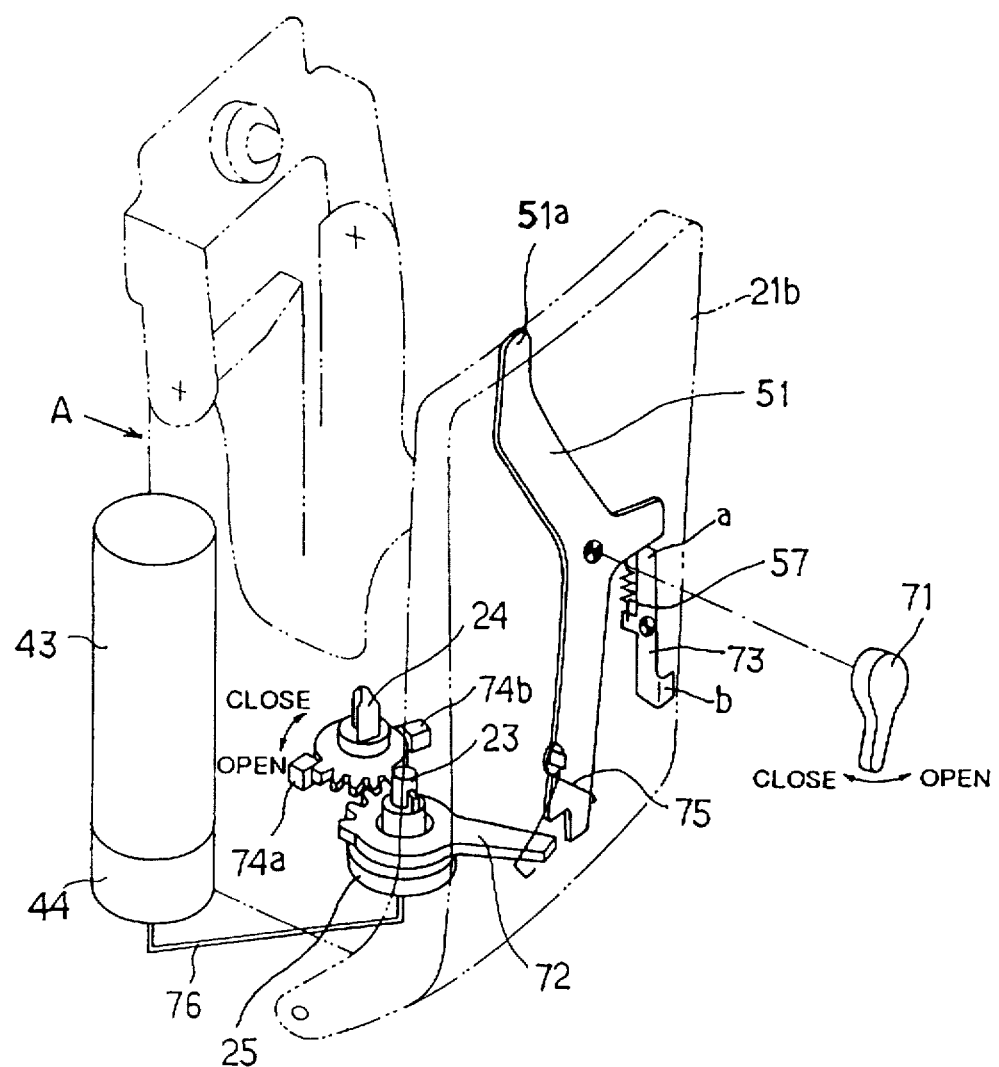
FIG. 9 is a perspective view showing a mechanism structure of a cartridge chamber in the second embodiment of the present invention.

FIG. 8 and FIG. 9 show perspective views of the cartridge chamber in the second embodiment. In this embodiment, although it is the same as the first embodiment that a lock and an ejection mechanism of the cartridge chamber is arranged in the movable cartridge chamber, its concrete structure differs from it. A manual operation knob 71 (operating member) to open and close the cartridge chamber is provided on the exterior of the cover 21b, and connected to the lock lever 51. When ejecting thus cartridge chamber 21, the lock lever 51 is moved unitedly with the knob 71 by rotating it manually, and then, the cartridge chamber 21 is unlocked and opened by a pressing force of a pressing spring 58 toward a direction shown by an arrow A. While one of ends of the lock lever 51 is engaged with a shading lid connection lever 72, the other is able to be engaged with the engagement lever 73. In the initial stroke of the lock lever 51 on unlocking as mentioned above, the shading lid driver 24 is driven toward a direction that it is closed, through the shading lid connection lever 72 and a gear connection. The shading lid driver 24 is stopped by a shading lid close stopper 74a. If moving the lock lever 51 over the stopper 74a, a lock claw 51a is disengaged from the camera body in the latter half stroke, which unlocks the cartridge chamber, and then, the engagement lever 73 rotates counterclockwise and a portion "a" runs onto and stops the lock lever 51 by engaging with it. The over-stroke is absorbed by a over-charge spring 75.

When closing the cartridge chamber 21 which is opened, a portion "b" of the engagement lever 73 rotates clockwise because of being pushed by a protrusion on a inner wall of the back side of the camera body, and disengages from the lock lever 51. Then, the lock lever 51 is rotated by the lock lever pressing spring 57, and the lock claw 51a Jumps into the camera body, which locks the cartridge chamber in the position that it is closed. Further, by means of the rotation of the lock lever 51, the shading lid driver 24 is driven to open the shading lid through the shading lid connection lever 72, and stopped by a shading lid open stopper 74b. The speed-reduced output power from the motor 43 is transmitted to a fork gear 25 through a transmission system 76 which transmits an output power to a fork, and a forward and a reverse rotation of the fork gear 25 thrusts and rewinds the film.

In the camera of the present embodiment, in addition to the same effect in the camera of the previously mentioned first embodiment, the shading lid 11 is certainly shut when the film cartridge 5 is taken out even in case of a shortage of a battery capacity because the shading lid 11 is driven to open and close by using the knob 71 (operating member) which is arranged on the cover 21b (exterior of the cartridge chamber) and the over-charge spring 75. It is different from a case of a motor driving structure. However, this effect is also able to be provided in a structure wherein at least either one of opening and closing of the shading lid 11 is executed by employing this kind of operating member, a spring or the like.

As a variation of the above-mentioned second embodiment, the shading lid 11 is able to be driven to open and close by a manual operation. In such a case, there is no need to arrange the engagement lever 73 because the lock lever 51 is stopped at the open position and close position by clicking or the like. While the locked and closed cartridge chamber 21 is opened in the same manner as mentioned above, the unlocked and opened cartridge chamber 21 is closed and locked in a manner that an user presses the chamber 21 for closing and rotates the knob 71 toward a closing direction. After the cartridge chamber 21 is locked and closed by the clicking, its position is detected by a switch, and then an initial operation such as a readout of a bar code or the film thrusting may be started.

Figure 10:
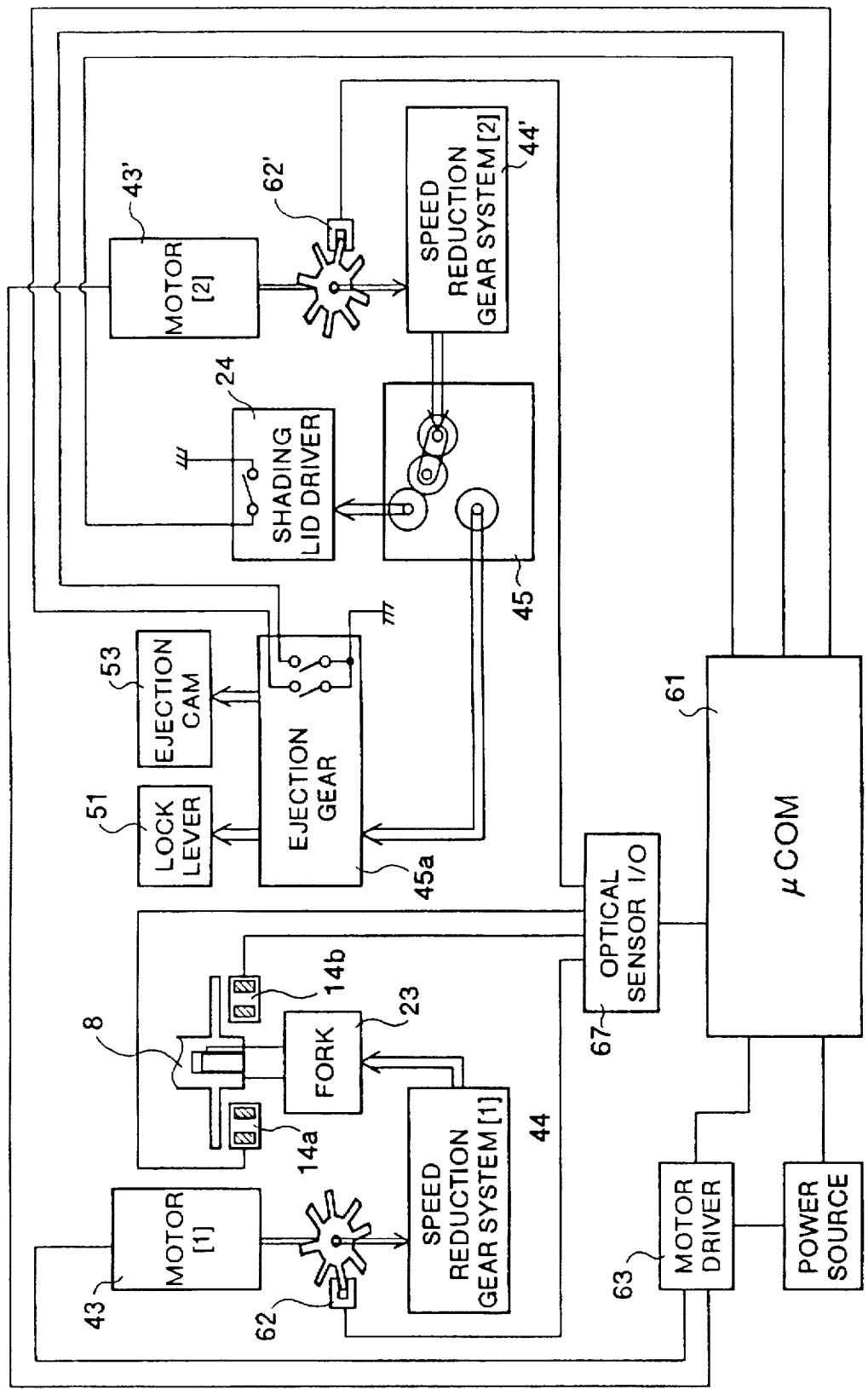
FIG. 10 is a circuit block diagram in case of using two motors in the third embodiment of the present invention.

FIG. 10 shows a circuit block diagram in the third embodiment of the present invention in case of using two motors 43 and 43' in the movable cartridge chamber 21. While in the above-mentioned FIG. 6, one motor drives all driven members in the cartridge chamber 21, in a structure of using two motors, functions were shared between those two motors. Output of the one motor [1] 43 drives a fork 23 to thrust and rewind a film, and the other motor [2] 43', being changed over, drives the shading lid to open and close, and locks and ejects the cartridge chamber. The motor rotation detection sensor 62' and a speed reduction gear system 44' are arranged in the output section of the motor [2] 43', and the speed reduction gear system 44' supplies a driving force to the output changeover mechanism 45, so that it changes over the output to drive the shading lid driver 24 or the ejection gear 45a. The driving force of the ejection gear 45a is transmitted to the lock lever 51 and the ejection cam 53 to lock and eject.

Figure 11:
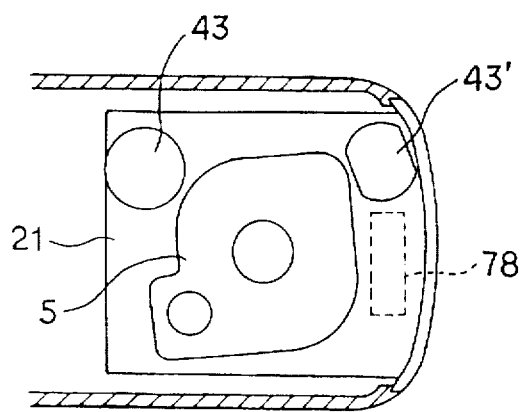
FIGS. 11(a), (b) and (c) are plane views showing arrangement examples of a motor in the case shown in FIG. 10.
Figure 11:
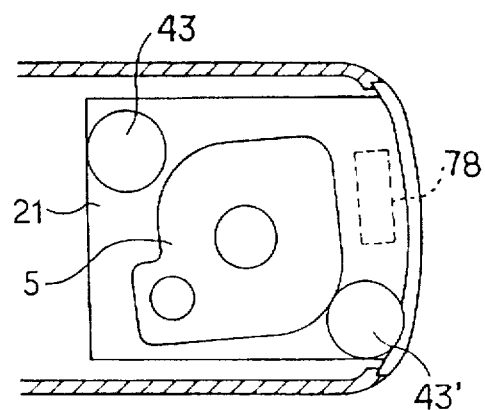
Figure 11:
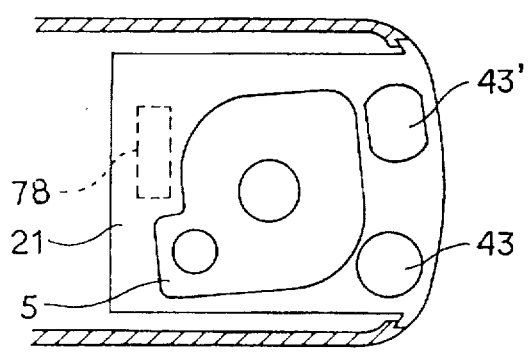

FIGS. 11(a), (b) and (c) show three examples of arrangement structure in case of using the above-mentioned two motors. Two motors 43, 43', and a lock mechanism 78 which is consisted of the lock lever 51, the ejection cam 53 and etc., are positioned in a space between the inner wall of the cartridge chamber 21 and the cartridge 5 as shown in the figures.

Figure 12:
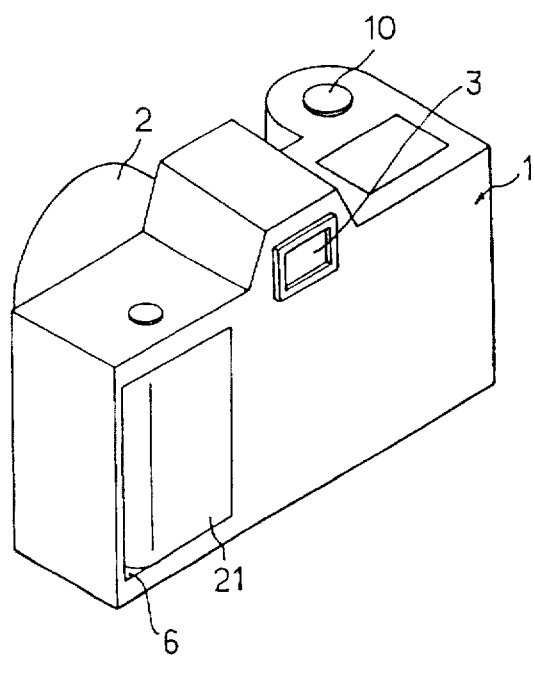
FIGS. 12(a) and (b) are perspective views showing a movement of a cartridge chamber in the fourth embodiment of the present invention.
Figure 12:
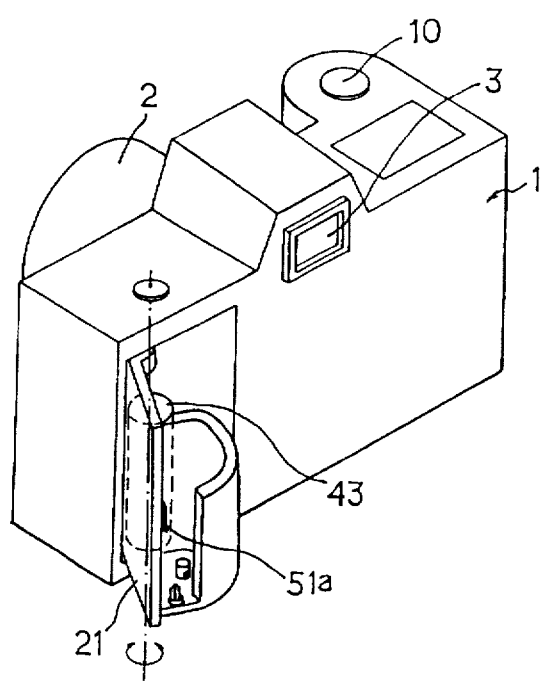

FIGS. 12(a) and (b) show a camera in the fourth embodiment. In this embodiment, a cartridge chamber is moved differently than the camera of the above-mentioned embodiment. FIG. 12(a) shows a state that the cartridge chamber 21 is closed, and FIG. 12(b) shows a state that the cartridge chamber 21 is opened. In this structure, Just like a back lid in the conventional camera, a cartridge chamber 21 is supported in the opening 6 so as to be rotatable on a pivot which is parallel to the cartridge's shaft, and be projected and retracted from the camera body. In this embodiment, since the weighty motor 43 is able to be disposed near around the rotational shaft, the cartridge chamber 21 is not loaded so much on its opening and closing, which makes it possible to be smoothly opened and closed.

Figure 13:
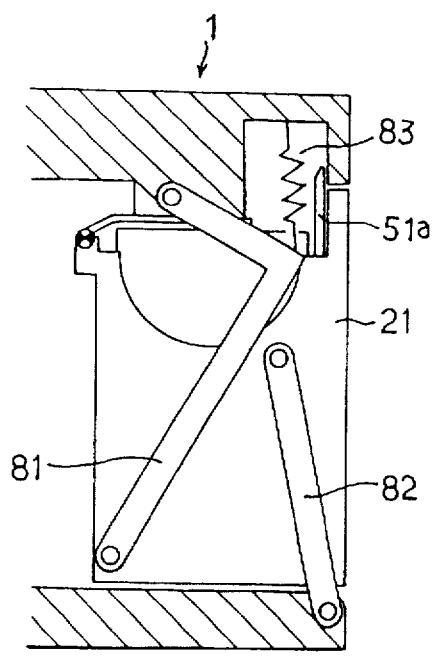
FIGS. 13(a) and (b) are sectional views showing a movement of a cartridge chamber in the fifth embodiment of the present invention.
Figure 13:
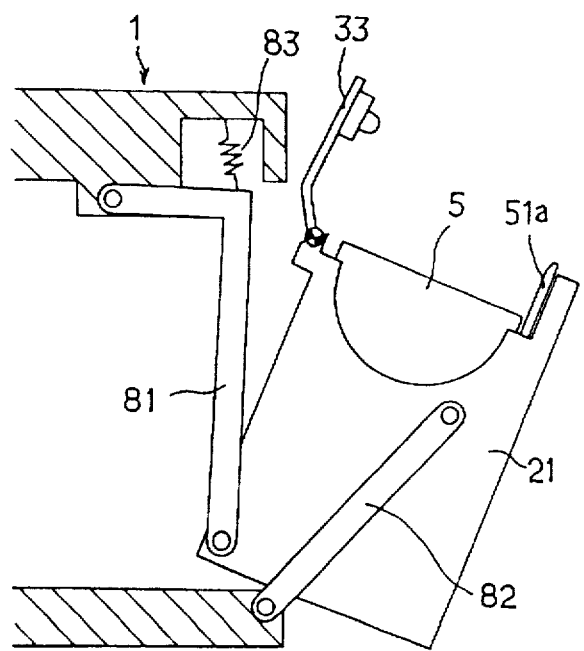

FIGS. 13(a) and (b) show a camera in the fifth embodiment. While FIG. 13(a) shows a state that the cartridge chamber 21 is closed, FIG. 13(b) shows a state that the cartridge chamber 21 is opened. In this embodiment, the cartridge chamber 21 is supported so as to be horizontally slided toward an opening 6 by two link-shaped levers 81, 82 and a pressing spring 83. The two link-shaped levers 81 and 82 are rotatably connected at both ends with the cartridge chamber 21 and the camera body. In addition, it can be projected and retracted from the camera body for taking in and out the film cartridge 5. The structure wherein the cartridge chamber 21 is slided so as to be projected and retracted can be also applied.

FIGS. 14(a), (b) and (c) show a lock mechanism and ejection mechanism of the cartridge chamber 21 in the sixth embodiment. While FIG. 14(a) shows a state that the cartridge chamber 21 is locked in a position that it is closed. FIG. 14(b) shows a state that it is unlocked and ejected into a position that it is opened. FIG. 14 (c) shows a bottom surface in the state shown in the FIG. 14(a). The same components as those of the above-mentioned FIG. 5 are denoted by the same reference numerals in these figures, and the lock mechanism and the ejection mechanism are directly connected to each other; that is, a lock connection lever 85 engaged with the lock lever 51 is supported on a rotational shaft 86, and an end of the lock connection lever 85 is engaged with an unlock cam 53b which is rotated unitedly with an ejection gear 53g; these are all arranged in the cartridge chamber 21. The ejection gear 53g is meshed with a fixed inside-tooth gear 55g which is arcuate-shaped, and arranged on an inner wall of the back side of the camera body 1. The unlock cam 53b and ejection gear 53g are driven to rotate by means that the driving force of the motor 43 is transmitted to the ejection input gear 53a which is arranged unitedly with them. The above-mentioned fixed inside-tooth gear 55g centers on the rotating shaft 22 to which the cartridge chamber 21 is supported.

When closing the cartridge chamber 21, the ejection input gear 53a is driven to rotate toward a direction reverse to that of an ejection by detecting with a switch that a film loading button (not shown) (an ejection button can be substituted) is operated, or slightly pushing in the cover 21b of the cartridge chamber 21. As a result, the cartridge chamber 21, moved reversely to that of the ejection, is closed by electrical drive, and finally locked, and returned to an initial state shown in FIG. 14(a).

In the above-mentioned structure, when the cartridge chamber is unlocked by reason that the ejection button (not shown) is operated, and the driving force of the motor 43, transmitted through the ejection gear 53a, drives the unlock cam 53b and ejection gear 53g to rotate. Then, the lock connection, lever 85 which is engaged with the unlock cam 53b is rotated so that the lock lever 51 is moved downward against the pressing force of the lock lever pressing spring 57, which unlocks the locked cartridge chamber 21. At the same time, since the ejection gear 53g is meshed with the fixed inside-tooth gear 55g, the cartridge chamber 21 is moved into a position that it is opened. In this embodiment, a power driving system of the motor 43 is directly connected to the cartridge chamber 21, so that a friction clutch or the like is arranged between the ejection input gear 53a and the ejection gear 53g in order to prevent; mechanisms from being damaged or an user's finger from being pinched.

Figure 15A:
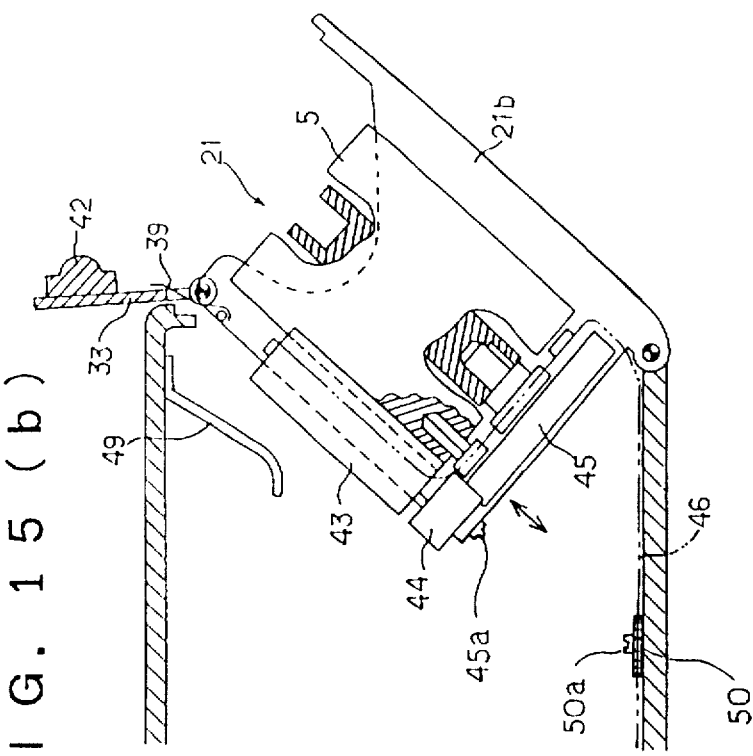
FIGS. 15(a), (b) and (c) are figures in the seventh embodiment of the present invention.
Figure 15B:
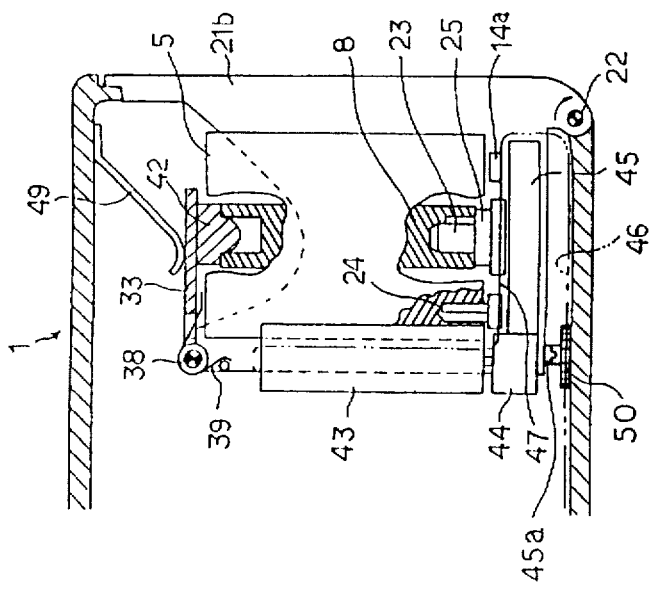
Figure 15C:
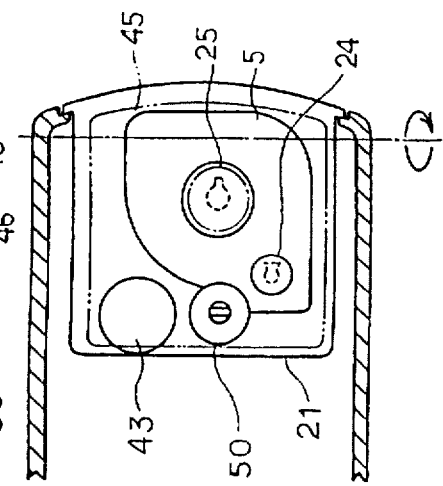
Figure 16A:
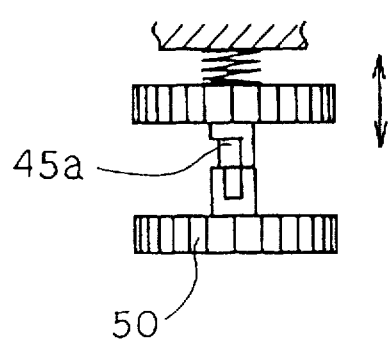
FIGS. 16(a) and (b) are views showing an engagement structure and their movement of a body input gear and an output coupler shaft.
Figure 16B:
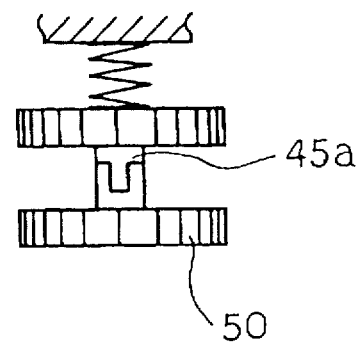
Figure 17:
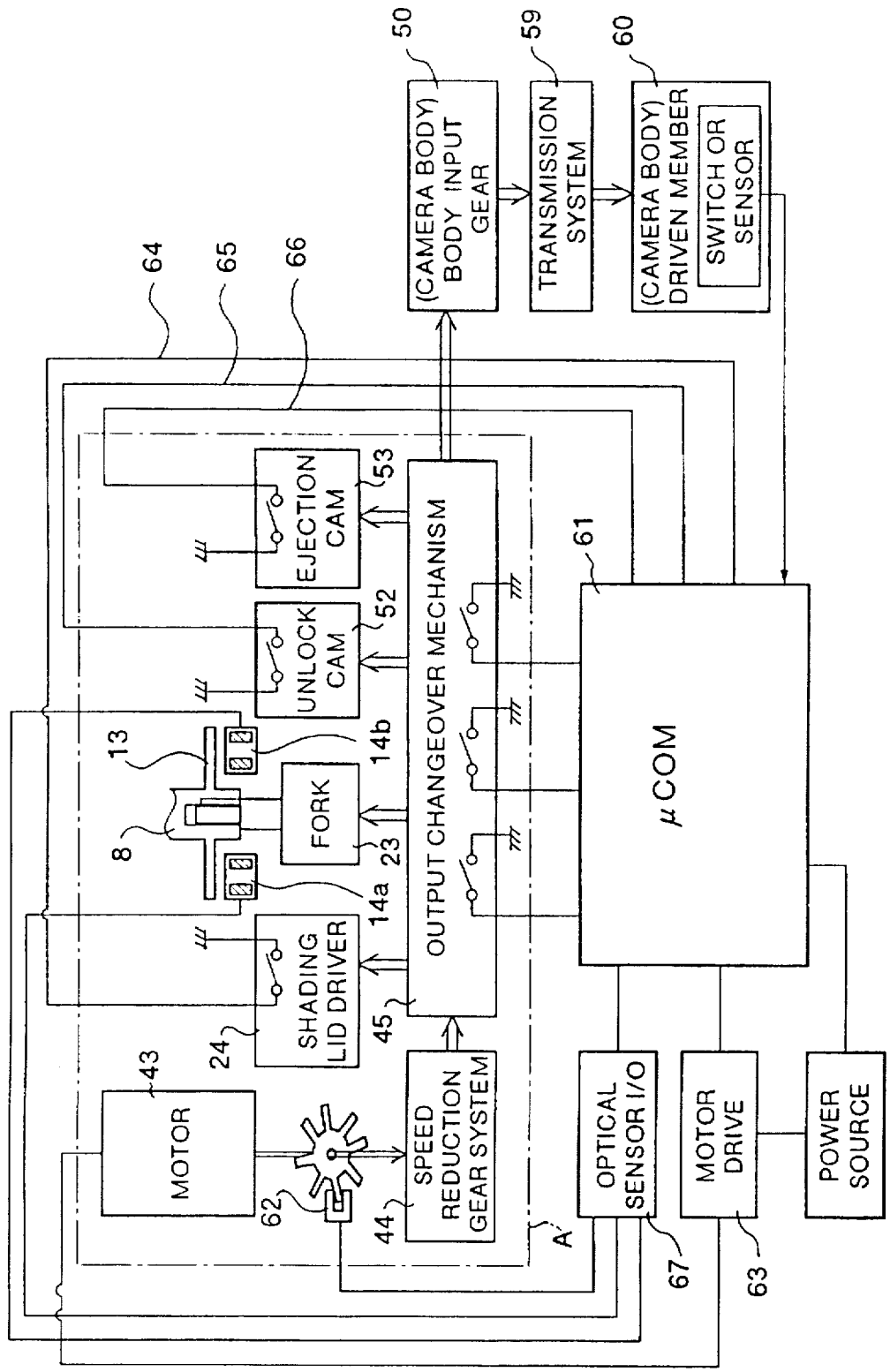
FIG. 17 is a circuit block diagram in case of using one motor in the seventh embodiment.

Now, the seventh embodiment of the present invention will be now explained referring to FIG. 15, FIG. 16 and FIG. 17. A changeover mechanism 45 which rotates unitedly with a cartridge chamber 21 changes over a transmission of an output of the motor 43 to each driven member, and comprises on the reverse side an output coupler shaft 45a which transmits an output power to the camera body. In addition, facing the output coupler shaft 45a, a body input gear 50 is arranged in the camera body. Both of the output coupler shaft 45a and the body input gear 50 constitute of a coupling mechanism (a mechanism so as to be engaged and disengaged) that transmits the output power from the cartridge chamber 21 to the camera body. A coupler key groove 50a of the body input gear 50 and the output coupler shaft 45a are engaged with each other in a state that the cartridge chamber 21 is closed, which is shown in FIGS. 16(a) and (b). FIG. 16(a) shows a state that they are disengaged from each other. FIG. 16(b) shows a state that they are engaged with each other, and the output coupler shaft 45a is able to be moved forward and backward in a direction indicated by an arrow. When closing the opened cartridge chamber 21, the output coupler shaft 45a and the body input gear 50 come in line. At this time, however, both coupler grooves may not engaged with each other. In such a case, the output coupler 45a moves away upward, after that, both coupler grooves engage with each other by turning the shaft.

FIG. 17, corresponding to FIG. 6, is a circuit block diagram of using one motor in the above-mentioned embodiment. It is to be noted that the same components as those of the first embodiment are denoted by the same reference numerals in this embodiment, and no explanation is provided thereof. A motor output, changed over by the output changeover mechanism 45, is transmitted to the body input gear 50 of the camera body, and then drives a driven member 60 of the camera body (outside of the unit of the movable cartridge chamber 21) through the transmission system 59. A movement state of the driven member 60 is detected by a switch or a sensor, and its signal is input to the μ COM 61 as a start/stop signal.

Now, modified embodiment of the above-mentioned embodiment will be explained concerning a structure of transmitting a motor output from the movable cartridge chamber 21 to the camera body side. In the above-mentioned embodiment, the changeover mechanism 45 that is arranged in the cartridge chamber 21, equips a mechanism (such as a clutch) for engaging and disengaging the transmission of the motor output in order to changeover it, so that, the changeover mechanism 45 is able to be concurrently served as a retraction mechanism of the coupling structure by arranging the section to engage and disengage between the camera body and the cartridge chamber, which can simplify the structure.

Figure 18A:
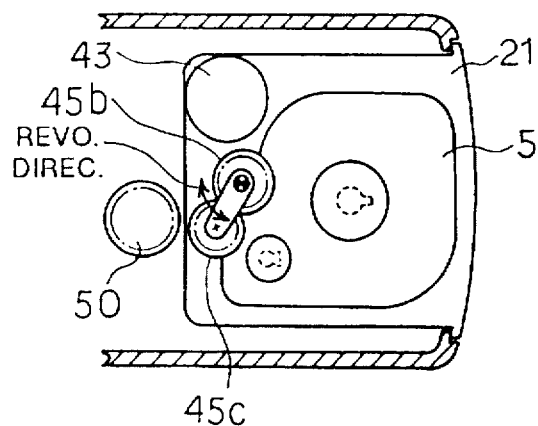
FIGS. 18(a) and (b) are bottom views of a cartridge chamber, showing a state capable of opening and closing a cartridge chamber, and a driving state in a camera body in the eighth embodiment.
Figure 18B:
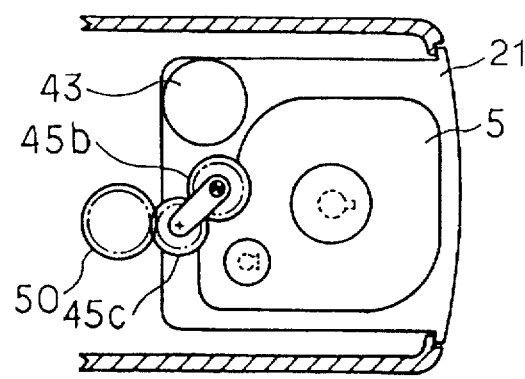

FIG. 18 is a bottom plane of the cartridge chamber 21 in the eighth embodiment. FIG. 18(a) shows a state that the cartridge chamber 21 is able to be opened and closed. FIG. 18(b) shows a state that the camera body is being driven, wherein the above-mentioned structure is simplified. In this embodiment, the changeover mechanism 45 (FIG. 15) of the cartridge chamber 21 comprises a planet gear 45c which meshes with and revolves around a gear 45b (solar gear) to which a motor output is transmitted, and whose structure is that, when closing the cartridge chamber 21, the motor output is changed over, and the planet gear 45c meshes with the body input gear 50 of the camera body by rotating around the gear 45b with projecting out of the cartridge chamber 21. While the cartridge chamber 21 is in the movement of opening and closing, the planet gear 45c is controlled to be positioned away from the body input gear 50. This prevents components from touching with each other so that some retraction mechanism is not needed to be arranged. A revolution of the planet gear 45c by means of changing over the motor output can be achieved by a planet gear changeover control cam (not shown) which is arranged inside the changeover mechanism 45.

Figure 19:
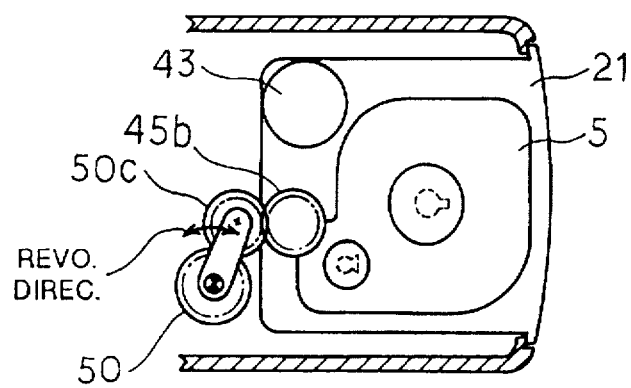
FIG. 19 is a bottom view of a cartridge chamber in the ninth embodiment of the present invention.

FIG. 19 is the ninth embodiment showing a variation of the above-mentioned eighth embodiment. In this embodiment, the planet gear is arranged in the camera body. The planet gear 50c, meshing with the body input gear 50 (solar gear), is engaged with and disengaged from the gear 45b on the cartridge chamber 21 side by another mechanism of the camera body. The above-mentioned engagement and disengagement can be executed by making the planet, gear 50c mesh with the gear 45b, interlocking with a closing movement of the cartridge chamber 21, (a revolution of the planet gear 50c is achieved by the planet gear changeover control cam or the like as well as described above);

otherwise, it can be achieved by making the planet gear 50c revolve and mesh with the gear 45b in case that a motor is disposed in the camera body.

Figure 20:
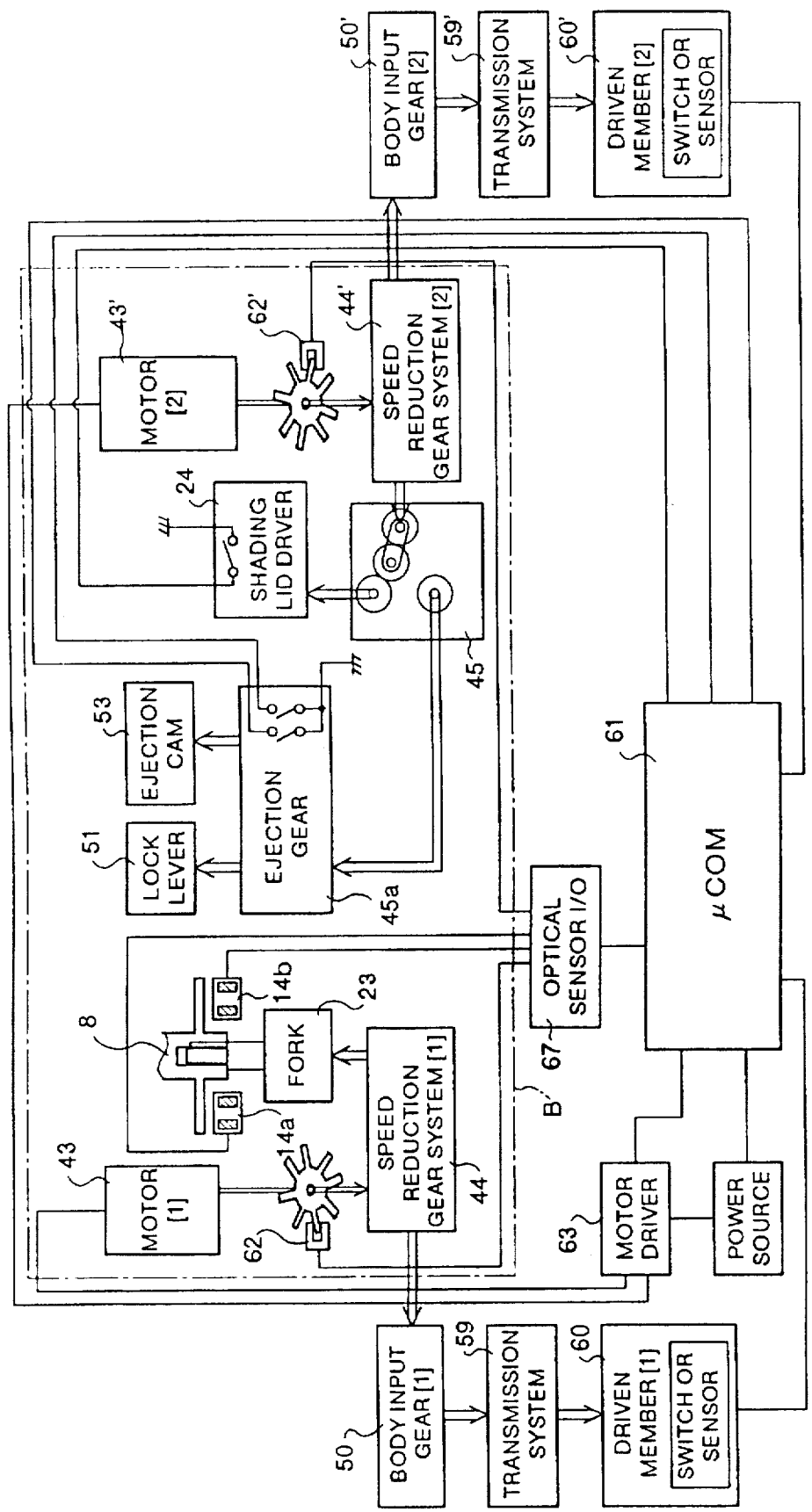
FIG. 20 is a circuit block diagram in case of using two motors in the tenth embodiment.

FIG. 20, corresponding to FIG. 10, is a circuit block diagram of using two motors 43 and 43' in a movable cartridge chamber 21 in the tenth embodiment. It is to be noted that the same components as those of the third embodiment are denoted by the same reference numerals in this embodiment, and no explanation is provided thereof. In this embodiment, a speed reduction gear system [1] 44 is engaged with and disengaged from the body input gear 50 by means of a coupling mechanism, and connected to a transmission system 59 and a driven member 60. A speed reduction gear system [2] 44' is also engaged with and disengaged from the body input gear 50', and connected to a transmission system 59' and a driven member 60'.

In the above-mentioned structure, it is able to be optionally set which is connected to the camera body, an output of the motor [1] 43, or that of the motor [2] 43'. For instance, if the output of the motor [1] 43 winds up the film while that of the motor [2] 43' executes releasing and charging, it is possible to simultaneously wind up the film and release a shutter. In FIG. 20, mechanisms of the movable cartridge chamber 21 are circled by a chain line. It is also possible to include an electric circuit such as a motor driver 63 and an optical sensor I/O 67 in the cartridge chamber 21 as similar to the case of using one motor.

Now, some examples of driven members in the camera body will be described with reference to FIG. 21, FIG. 22 and FIG. 23. FIG. 21 shows an example of winding up the film. A motor output is transmitted to the body input gear 50 through an engagement and disengagement mechanism from a speed reduction and output changeover mechanism 45 which is arranged in the movable cartridge chamber 21, and further transmitted to a spool gear 92 of a winding spool 91 through a transmission system 90. Thus, a film is wound up. Stopping of the film winding up can be done in response to a signal of a film perforation sensor 93.

FIG. 22 shows an example of charging and releasing a mirror and a shutter. A motor output is transmitted to the body input gear 50 in the same way, and further transmitted to a charge and release cam gear 95 through a transmission system 94, which drives a mirror and shutter driving mechanism 96 to charge and release the mirror and shutter. The charging and releasing are completed in response to a detection signal of a cam gear phase switch 94. A winding up spool 91 is driven by a winding up motor 98 arranged in the camera body.

Figure 23:
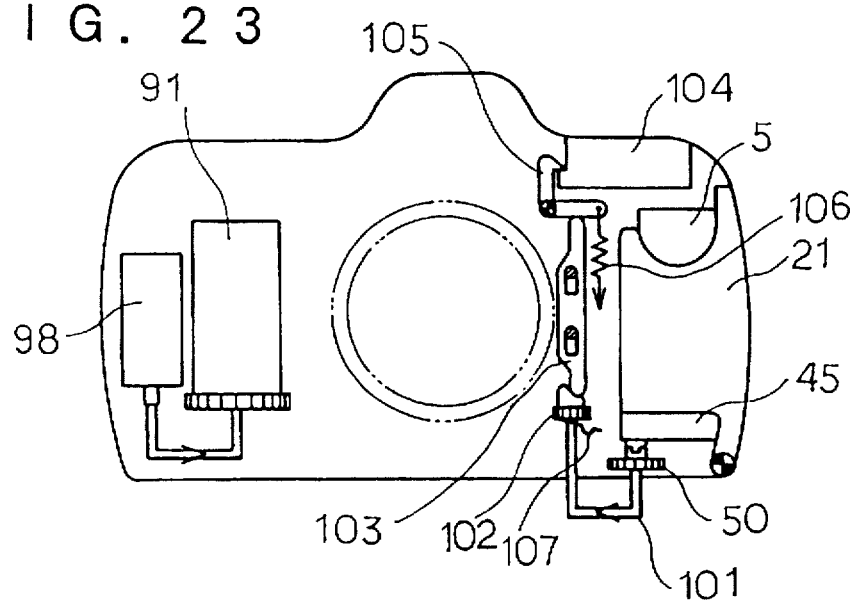
FIG. 23 is a structural view of popping up a built-in flash.

FIG. 23 shows an example of popping up a built-in flash. A motor output is transmitted to the body input gear 50 in the same way as mentioned above, and further transmitted to a flash pop-up solid cam 102, through the up-and-down of a slide lever 103, and then, disengages a pop-up flash 104, and pops it up. The flash 104 is engaged by an engagement claw 105 and an engagement claw pressing spring 106. Stopping of the popping up is made according to a signal from solid cam phase switch 107.

As for driven members in the camera body, the flash zooming, lens driving, opening and closing movement of a lens barrier, and the like are given as other examples. As for the structure of the engagement and disengagement mechanism of the motor output, in addition to the engagement between the retractable key and the key groove, and meshing between the planet gear and the driven gear as described above, a contact transmission between a planet gear (or a belt) and a driven roller (or a pulley) are given as an other example.

As many apparently widely different embodiments of this invention may be made without departing from the spirit and scope thereof, it is to be understood that the invention is not limited to the specific embodiments thereof except as defined in the appended claims.

What is claimed is:

1. A camera in use of a film cartridge which contains a film wound around a winding shaft in a light-shielding condition, comprising:

a cartridge chamber which accommodates a film cartridge, having a hollow to take in and out the film cartridge, and is supported to a camera body so as to open and close between a position that the hollow is projected out of the camera body and a position that the cartridge chamber is contained in the camera body; and a motor which is disposed in the cartridge chamber and executes at least either one of opening and closing of the cartridge chamber.

2. The camera as claimed in claim 1, further comprising:

a lock means which locks the cartridge chamber in the position that the chamber is contained in the camera body.

3. The camera as claimed in claim 2, wherein the motor unlocks a condition which is locked by the lock means.

4. The camera as claimed in claim 2, further comprising:

a pressing means which presses the cartridge chamber to move into a position that the chamber is projected.

5. The camera as claimed in claim 1, wherein the film cartridge has a film winding shaft, and the motor is disposed so that its rotational shaft is in a line of the film winding shaft.

6. A camera in use of a film cartridge which contains a film wound around a winding shaft in a light-shielding condition, comprising:

a cartridge chamber which accommodates the film cartridge;

a motor which is disposed in the cartridge chamber;

driven members which are arranged in the camera body and driven by the motor; and, a driving force transmitting means which transmits a driving force of the motor to the driven members in the camera body.

7. The camera as claimed in claim 6, further comprising:

driven members which are different from the driven members in the camera body, and driven by the motor;

a driving force changeover means which changes over a transmission of the motor to the driven members in the camera body or to said driven members.

8. The camera as claimed in claim 7, wherein the cartridge chamber is supported to the camera body so as to open and close between a position that a hollow to take in and out the film cartridge is projected out of the camera body and a position that the chamber is contained in the camera body, and the driven members are driven by the motor in order to execute at least either one of opening and closing of the cartridge chamber.

9. A camera in use of a film cartridge which contains a film wound around a winding shaft in a light-shielding condition, comprising:

a cartridge chamber which accommodates a film cartridge;

a motor which is disposed in the cartridge chamber; and, driven members which are arranged in the cartridge chamber and driven by the motor.

10. The camera as claimed in claim 9, wherein the film cartridge has a film winding shaft, and the film is wound and thrust by a forward and a reverse rotation of the film winding shaft, and the driven member is a film winding shaft drive member connected to the film winding shaft.

11. The camera as claimed in claim 10, further comprising:

a bar code plate which is arranged on the film winding shaft, and rotates unitedly with the film winding shaft, and wherein data on a kind of the film, a film quality, and an unexposed condition of the film are written in the bar code.

12. The camera as claimed in claim 9, wherein the film cartridge has a shading lid which is capable of opening and closing on an exit for the film, and the driven member is a shading lid drive member connected to the shading lid.

13. The camera as claimed in claim 12, wherein a driving force of the motor executes at least either one of opening and closing of the shading lid.

14. The camera as claimed in claim 12, further comprising:

a pressing means for pressing the shading lid into at least either one of a position that the shading lid is opened and a position that the shading lid is closed.

15. The camera as claimed in claim 12, further comprising:

an operating means which is arranged on an exterior of the cartridge chamber, and executes at least either one of opening and closing of the shading lid.

* * * * *